(12) United States Patent
Bornhoevd et al.

(10) Patent No.: US 8,156,208 B2
(45) Date of Patent: Apr. 10, 2012

(54) HIERARCHICAL, MULTI-TIERED MAPPING AND MONITORING ARCHITECTURE FOR SERVICE-TO-DEVICE RE-MAPPING FOR SMART ITEMS

(75) Inventors: Christof Bornhoevd, Belmont, CA (US); Artin Avanes, Berlin (DE); Holger R. Ziekow, Berlin (DE); Brian S. Mo, Palo Alto, CA (US); Matthias M. Wiemann, Jugenheim (DE)

(73) Assignee: SAP AG, Walldorf (DE)

( * ) Notice: Subject to any disclaimer, the term of this patent is extended or adjusted under 35 U.S.C. 154(b) by 1193 days.

(21) Appl. No.: 11/583,274

(22) Filed: Oct. 18, 2006

(65) Prior Publication Data

US 2007/0130208 A1    Jun. 7, 2007

Related U.S. Application Data

(63) Continuation of application No. 11/284,195, filed on Nov. 21, 2005.

(51) Int. Cl.
*G06F 15/173* (2006.01)
(52) U.S. Cl. ........................................ 709/221
(58) Field of Classification Search .................. 709/203, 709/201, 221; 705/1
See application file for complete search history.

(56) References Cited

U.S. PATENT DOCUMENTS

| | | | |
|---|---|---|---|
| 5,740,357 A | 4/1998 | Gardiner et al. |
| 5,768,568 A | 6/1998 | Inui et al. |
| 5,805,820 A | 9/1998 | Bellovin et al. |
| 5,809,012 A | 9/1998 | Takase et al. |
| 5,940,593 A | 8/1999 | House et al. |
| 6,016,499 A | 1/2000 | Ferguson |
| 6,023,702 A | 2/2000 | Leisten et al. |
| 6,065,052 A | 5/2000 | Van Loo |
| 6,138,162 A | 10/2000 | Pistriotto et al. |
| 6,167,438 A | 12/2000 | Yates et al. |
| 6,178,173 B1 | 1/2001 | Mundwiler et al. |
| 6,184,778 B1 | 2/2001 | Tsuji |
| 6,189,038 B1 | 2/2001 | Thompson et al. |
| 6,199,195 B1 | 3/2001 | Goodwin et al. |

(Continued)

FOREIGN PATENT DOCUMENTS

CN     1620653 A    5/2005

(Continued)

OTHER PUBLICATIONS

Foster, I. et al., "The Open Grid Services Architecture, Version 1.0", Informational Document, Global Frid Forum (Jan. 29, 2005), pp. 1-62.

(Continued)

*Primary Examiner* — Joe Cheng
*Assistant Examiner* — Najeeb Ansari
(74) *Attorney, Agent, or Firm* — Brake Hughes Bellermann LLP

(57) ABSTRACT

A service repository is used to store at least one service in association with service metadata describing service requirements of the service. The service repository also may store one or more platform-specific service executables. A service mapper is used to determine device metadata associated with each of a plurality of devices, where the device metadata provides device characteristics of the devices. The service mapper may thus map the service to a selected device of the plurality of devices for deployment thereon, based on a matching of corresponding elements of the service requirements and the device characteristics. The service mapper also may re-map the service between devices to maintain a quality and reliability of the service.

20 Claims, 17 Drawing Sheets

U.S. PATENT DOCUMENTS

| | | |
|---|---|---|
| 6,226,788 B1 | 5/2001 | Schoening et al. |
| 6,256,739 B1 | 7/2001 | Skopp et al. |
| 6,262,726 B1 | 7/2001 | Stedman et al. |
| 6,292,856 B1 | 9/2001 | Marcotte |
| 6,308,178 B1 | 10/2001 | Chang et al. |
| 6,343,287 B1 | 1/2002 | Kumar et al. |
| 6,363,411 B1 | 3/2002 | Dugan et al. |
| 6,378,128 B1 | 4/2002 | Edelstein et al. |
| 6,442,748 B1 | 8/2002 | Bowman-amuah |
| 6,460,082 B1 | 10/2002 | Lumelsky et al. |
| 6,480,977 B1 | 11/2002 | Apisdorf et al. |
| 6,606,740 B1 | 8/2003 | Lynn et al. |
| 6,643,669 B1 | 11/2003 | Novak et al. |
| 6,654,953 B1 | 11/2003 | Beaumont et al. |
| 6,686,838 B1 | 2/2004 | Rezvani et al. |
| 6,687,846 B1 | 2/2004 | Adrangi et al. |
| 6,694,335 B1 | 2/2004 | Hopmann et al. |
| 6,757,720 B1 | 6/2004 | Weschler, Jr. |
| 6,785,707 B2 | 8/2004 | Teeple |
| 6,816,862 B2 | 11/2004 | Mulgund et al. |
| 6,832,373 B2 | 12/2004 | O'Neill |
| 6,842,903 B1 | 1/2005 | Weschler |
| 6,847,974 B2 | 1/2005 | Wachtel |
| 6,859,831 B1 | 2/2005 | Gelvin et al. |
| 6,891,823 B1 | 5/2005 | Schwartz et al. |
| 6,892,236 B1 | 5/2005 | Conrad et al. |
| 6,927,686 B2 | 8/2005 | Nieters et al. |
| 6,961,763 B1 | 11/2005 | Wang et al. |
| 6,980,993 B2 | 12/2005 | Horvitz et al. |
| 6,986,148 B2 | 1/2006 | Johnson et al. |
| 6,990,660 B2 | 1/2006 | Moshir et al. |
| 7,024,430 B1 | 4/2006 | Ingraham et al. |
| 7,043,419 B2 | 5/2006 | Chess et al. |
| 7,072,960 B2 | 7/2006 | Graupner et al. |
| 7,075,960 B2 | 7/2006 | Kohara et al. |
| 7,096,461 B1 | 8/2006 | Nakamura et al. |
| 7,099,582 B2 | 8/2006 | Belhadj-Yahya et al. |
| 7,099,946 B2 | 8/2006 | Lennon et al. |
| 7,114,146 B2 | 9/2006 | Zhang et al. |
| 7,116,674 B2 | 10/2006 | Shi |
| 7,130,773 B1 | 10/2006 | Wong |
| 7,152,019 B2 | 12/2006 | Tarantola et al. |
| 7,171,471 B1 | 1/2007 | Nair |
| 7,206,289 B2 | 4/2007 | Hamada |
| 7,219,254 B2 | 5/2007 | Rathunde et al. |
| 7,227,889 B1 | 6/2007 | Roeck et al. |
| 7,237,243 B2 | 6/2007 | Sutton et al. |
| 7,286,158 B1 | 10/2007 | Griebenow |
| 7,292,963 B2 | 11/2007 | Bornhoevd et al. |
| 7,302,401 B1 | 11/2007 | Tervonen |
| 7,304,976 B2 | 12/2007 | Mao et al. |
| 7,312,703 B2 | 12/2007 | Hoogenboom |
| 7,313,467 B2 | 12/2007 | Breed et al. |
| 7,382,741 B2 | 6/2008 | Rao |
| 7,413,513 B2 | 8/2008 | Nguyen et al. |
| 7,506,338 B2 | 3/2009 | Alpern et al. |
| 7,554,920 B2 | 6/2009 | Alam et al. |
| 7,557,707 B2 | 7/2009 | Kumar et al. |
| 7,584,471 B2 | 9/2009 | Bjaere et al. |
| 7,616,642 B2 | 11/2009 | Anke et al. |
| 7,752,068 B1 | 7/2010 | Micklavzina et al. |
| 7,756,969 B1 | 7/2010 | Clarke et al. |
| 7,853,946 B2 | 12/2010 | Minagawa |
| 7,860,968 B2 | 12/2010 | Bornhoevd et al. |
| 7,890,568 B2 | 2/2011 | Belenki |
| 7,930,143 B2 | 4/2011 | Tarantola et al. |
| 2002/0007422 A1 | 1/2002 | Bennett |
| 2002/0100036 A1* | 7/2002 | Moshir et al. ................ 717/173 |
| 2002/0161751 A1 | 10/2002 | Mulgund et al. |
| 2002/0174169 A1 | 11/2002 | Schmid |
| 2002/0184103 A1 | 12/2002 | Shah et al. |
| 2002/0188866 A1 | 12/2002 | Ca et al. |
| 2002/0199173 A1 | 12/2002 | Bowen |
| 2003/0005350 A1 | 1/2003 | Koning et al. |
| 2003/0016664 A1 | 1/2003 | MeLampy et al. |
| 2003/0050902 A1 | 3/2003 | Buczak et al. |
| 2003/0078946 A1 | 4/2003 | Costello et al. |
| 2003/0097443 A1 | 5/2003 | Gillett et al. |
| 2003/0217186 A1 | 11/2003 | Bushey |
| 2003/0228910 A1 | 12/2003 | Jawaharlal et al. |
| 2004/0024768 A1 | 2/2004 | Haller |
| 2004/0059810 A1 | 3/2004 | Chess |
| 2004/0088231 A1 | 5/2004 | Davis |
| 2004/0111499 A1 | 6/2004 | Dobrowski et al. |
| 2004/0121792 A1 | 6/2004 | Allen et al. |
| 2004/0166807 A1 | 8/2004 | Vesikivi et al. |
| 2004/0181541 A1 | 9/2004 | Groenendaal et al. |
| 2004/0193703 A1 | 9/2004 | Loewy et al. |
| 2004/0220910 A1 | 11/2004 | Zang et al. |
| 2004/0243352 A1 | 12/2004 | Morozumi et al. |
| 2004/0249944 A1 | 12/2004 | Hosking et al. |
| 2004/0250113 A1 | 12/2004 | Beck |
| 2005/0060365 A1* | 3/2005 | Robinson et al. ............. 709/203 |
| 2005/0071443 A1 | 3/2005 | Menon et al. |
| 2005/0080892 A1 | 4/2005 | Moser et al. |
| 2005/0114431 A1 | 5/2005 | Sing et al. |
| 2005/0183061 A1 | 8/2005 | Papanikolaou et al. |
| 2005/0198228 A1* | 9/2005 | Bajwa et al. .................. 709/220 |
| 2005/0228763 A1 | 10/2005 | Lewis et al. |
| 2005/0235058 A1 | 10/2005 | Rackus et al. |
| 2005/0235136 A1 | 10/2005 | Barsotti et al. |
| 2006/0022801 A1 | 2/2006 | Husak et al. |
| 2006/0026591 A1 | 2/2006 | Backhouse et al. |
| 2006/0029054 A1 | 2/2006 | Breh et al. |
| 2006/0047545 A1 | 3/2006 | Kumar et al. |
| 2006/0052882 A1 | 3/2006 | Kubach et al. |
| 2006/0074912 A1 | 4/2006 | Borthakur et al. |
| 2006/0085798 A1 | 4/2006 | Bendiksen et al. |
| 2006/0106581 A1 | 5/2006 | Bornhoevd et al. |
| 2006/0107284 A1 | 5/2006 | Crawford et al. |
| 2006/0129367 A1 | 6/2006 | Mishra et al. |
| 2006/0143181 A1 | 6/2006 | Liu et al. |
| 2006/0143592 A1 | 6/2006 | Bender et al. |
| 2006/0146991 A1 | 7/2006 | Thompson et al. |
| 2006/0161909 A1 | 7/2006 | Pandey et al. |
| 2006/0173726 A1 | 8/2006 | Hall et al. |
| 2006/0206582 A1 | 9/2006 | Finn |
| 2006/0212453 A1 | 9/2006 | Eshel et al. |
| 2006/0212698 A1 | 9/2006 | Peckover |
| 2006/0215601 A1 | 9/2006 | Vleugels et al. |
| 2006/0225064 A1 | 10/2006 | Lee et al. |
| 2006/0235976 A1 | 10/2006 | Chen et al. |
| 2006/0265661 A1 | 11/2006 | Ball |
| 2006/0277079 A1 | 12/2006 | Gilligan et al. |
| 2007/0011334 A1 | 1/2007 | Higgins et al. |
| 2007/0032244 A1 | 2/2007 | Counts et al. |
| 2007/0112574 A1* | 5/2007 | Greene ........................... 705/1 |
| 2007/0118496 A1 | 5/2007 | Bornhoevd et al. |
| 2007/0118549 A1 | 5/2007 | Bornhoevd et al. |
| 2007/0118560 A1 | 5/2007 | Bornhoevd et al. |
| 2007/0123256 A1 | 5/2007 | Whitesell et al. |
| 2007/0130217 A1 | 6/2007 | Linyard et al. |
| 2007/0168690 A1 | 7/2007 | Ross |
| 2007/0168919 A1 | 7/2007 | Henseler et al. |
| 2007/0168925 A1 | 7/2007 | Bornhoevd et al. |
| 2007/0192464 A1 | 8/2007 | Tullberg et al. |
| 2007/0204261 A1 | 8/2007 | Fetzer et al. |
| 2007/0233881 A1 | 10/2007 | Nochta et al. |
| 2007/0249286 A1 | 10/2007 | Ma et al. |
| 2007/0251998 A1 | 11/2007 | Belenki |
| 2007/0276619 A1* | 11/2007 | Sugahara et al. ............... 702/82 |
| 2007/0276674 A1 | 11/2007 | Hemmat |
| 2007/0282746 A1 | 12/2007 | Anke et al. |
| 2007/0282988 A1 | 12/2007 | Bornhoevd et al. |
| 2007/0283001 A1 | 12/2007 | Spiess et al. |
| 2007/0283002 A1 | 12/2007 | Bornhoevd et al. |
| 2008/0010284 A1 | 1/2008 | Beck |
| 2008/0033785 A1 | 2/2008 | Anke |
| 2008/0052314 A1 | 2/2008 | Batabyal |
| 2008/0270486 A1 | 10/2008 | Hind et al. |
| 2008/0306798 A1 | 12/2008 | Anke et al. |
| 2009/0097397 A1 | 4/2009 | Moreira |
| 2010/0122236 A1 | 5/2010 | Bugir et al. |

FOREIGN PATENT DOCUMENTS

| | | |
|---|---|---|
| EP | 0384339 A2 | 8/1990 |
| EP | 0697654 A1 | 2/1996 |

| | | | |
|---|---|---|---|
| EP | 0817020 | A2 | 1/1998 |
| EP | 0810755 | A3 | 3/1999 |
| EP | 1372073 | A2 | 12/2003 |
| EP | 1788480 | A2 | 5/2007 |
| EP | 1863223 | A1 | 12/2007 |
| EP | 1892656 | A1 | 2/2008 |
| JP | 2002500785 | T2 | 1/2002 |
| JP | 2003067351 | A | 3/2003 |
| JP | 2004110318 | A2 | 4/2004 |
| WO | 02095605 | A1 | 11/2002 |
| WO | 2005/106666 | A1 | 11/2005 |

OTHER PUBLICATIONS

Baker, M. et al., "Grids and Grid Technologies for wide-area Distributed Computing", Software—Practice & Experience (Sep. 27, 2002), pp. 1437-1466.

Mikic-Rakic, M et al., "Improving availability in large, distributed component-based systems via redeployment", LNCS, vol. 3798 (Nov. 3, 2005), 15 pgs.

Malek, S et al., "A decentralized redeployment algorithm for improving the availability of distributed systems", LNCS, vol. 3798 (Nov. 3, 2005), 13 pgs.

Hoareau, D et al., "Constraint-Based Deployment of Distributed Components in a Dynamic Network", LNCS, vol. 3894 (Mar. 16, 2006), pp. 450-464.

Bitkom, "RFID White Paper Technology, Systems and Applications", An Overview for companies seeking to use RFID technology to connect their IT systems directly to the "real" world, Dec. 2005, 50 pgs.

Mikic-Rakic, M et al., "A tailorable environment for assessing the quality of deployment architectures in highly distributed settings", Second International Working Conference on Component Deployment (2004), pp. 1-15.

Ploennigs, J et al., "A traffic model for networked devices in the building automation", In: Proceedings of the 5th IEEE International Workshop on Factory Communication Systems (WFCS 2004), Vienna, Austria, (2004), pp. 137-145.

Wu, Q et al., "Adaptive component allocation in scudware middleware for ubiquitous computing", LNCS, vol. 3824 (Dec. 6, 2005), pp. 1155-1164.

Wegdam, M et al., "Dynamic reconfiguration and load distribution in component middleware", PhD thesis, University of Twente, Enschede, (2003), pp. 1-257.

Colt, Charles et al., "Oracle Â® Collaboration Suite, Deployment Guide10g Release 1 (10.1.1) B14479-02", (Oct. 2005), pp. 1-230.

Malek, S et al., "A style-aware architectural middleware for resource-constrained, distributed systems", IEEE Transactions on Software Engineering, vol. 31, Issue 3 (Mar. 2005), pp, 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Procedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Basile, Claudio et al., "A Survey of Dependability Issues in Mobile Wireless Networks", Technical Report, LAAS CNRS Toulouse (Feb. 21, 2003), pp. 1-45.

Buchholz, Sven et al., "Adaptation-Aware Web Caching: Caching in the Future Pervasive Web", In: KiVS, (2003), pp. 55-66.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

ETSI, "Selection procedures for the choice of radio transmission technologies of the UMTS", Universal Mobile Telecommunications System 30.03 version 3.2.0 (Apr. 1998), pp. 1-84.

Fredriksson, Johan et al., "Calculating Resource Trade-offs when Mapping Component Services to Real-Time Tasks", Fourth Conference on Software Engineering Research and Practice (Oct. 2004), pp. 1-8.

Hasiotis, Tilemahos et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Sgroi, Marco et al., "A Service-Based Universal Application Interface for Ad-hoc Wireless Sensor Networks", Preliminary Draft (Nov. 26, 2003), pp. 1-39.

Srivastava, Utkarsh et al., "Operator Placement for In-Network Stream Query Processing", Proceedings of the 24th ACM SIGMOD-SIGART-SIGART Symposium on Principles of Database Systems (Dec. 2004), pp. 1-10.

Vigna, Giovanni "Mobile Code Technologies, Paradigms, and Applications", PhD Thesis, Politecnico di Milano, Milano, Italy, (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes An Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Kotov, V. et al., "Optimization of E-Service Solutions With the Systems of Servers Library", Hewlett Packard, Modeling, Analysis and Simulation of Computer and Telecommunicatiion Systems (Aug. 29, 2000), pp. 575-582.

Perkins, C. et al., "IP Mobility Support for IPv4", IETF Standard, Internet Engineering Task Force (Aug. 2002), pp. 1-100.

Deering, S. et al., "ICMP Router Discovery Messages", IETF Standard, Internet Engineering Task Force (Sep. 1991), pp. 1-19.

Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.

Anke, Jurgen, et al, "Deployment Planning for Components in Smart Item Environments based on Evaluation of Cost and Availability", pp. 1-16.

Anke, J. et al., "A Service-Oriented Middleware for Integration and Management of Heterogeneous Smart Items Environments", Proceedings of the 4th MiNEMA Workshop, Jul. 2006, pp. 7-11.

Golatowski, F et al., "Service-Oriented Software Architecture for Sensor Networks", International Workshop on Mobile Computing (Jun. 17-18, 2003), pp. 1-8.

Tong, G., et al., "Toward QoS Analysis of Adaptive Service-Oriented Architecture", Service-Oriented System Engineering, IEEE International Workshop (Oct. 20, 2005), pp. 1-8.

Wonohoesodo, R et al., "A Role Based Access Control for Web Services", Proceedings of the 2004 IEEE International Conference on Services Computing (2004), pp. 49-56.

Prabhu, B S., et al., "WinRFID—A Middleware for the Enablement of Radio Frequency Identification (RFID) Based Applications", Mobile, Wireless and Sensor Networks (Mar. 28, 2006), pp. 1-23.

Information Society Technologies, "State of the Art in Resource Management on Wired and Wireless Access Networks with Resilience", Jul. 23, 2004, pp. 1-198.

Carvalho, H et al., "A General Data Fusion Architecture", Proceedings of the 6th International Conference on Information Fusion (Jul. 2003), pp. 1-8.

Hawick, K A., et al., "Middleware for Wireless Sensors and Robots", DHPC Technical Report DHPC-112 (Aug. 18, 2002), pp. 1-6.

European Search Report for Application No. EP07005127.1, mailed Jul. 20, 2007, pp. 1-3.

European Search Report for Application No. EP07008409.0, mailed Aug. 24, 2007, pp. 1-4.

European Search Report for Application No. EP07009428.9, mailed Oct. 4, 2007, pp. 1-4.

European Search Report for Application No. EP07014724.4, mailed Nov. 27, 2007, pp. 1-4.

European Search Report for Application No. EP06023720.3, mailed Apr. 10, 2007, pp. 1-4.

European Seach Report for Application No. EP06023256.8, mailed May 9, 2007, pp. 1-5.

European Search Report for EP Application No. 07010652.1 mailed on Oct. 26, 2007, 3 pgs.

Extended European Search Report for Application No. 08017795.9, mailed Feb. 10, 2009, 11 pgs.

European Search Report for Application No. 07010671.1 mailed on Nov. 16, 2007, 4 pgs.

European Search Report for EP Application No. 07010654.7 mailed on Oct. 5, 2007, 4 pgs.

Domagalski, R., et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24 2004, 12 pages.

Spiess, P., et al, "Collaborative Business Items", Deliverable 401: Final Project Report, CoBIs Project No. IST-004270, Version 2.0 (Mar. 2007), pp. 1-42.

"MVP Brochure", Bitfone Corporation (2005), www.bitfone.com/usa/uploads/mvp.brochure (Retrieved Sep. 20, 2005), pp. 1-3.

"FAQ: Fault management—How does Fault Management Work?" GoAhead Software (2000), 9 pgs.

Spiess, P., et al, "Collaborative Business Items", Deliverable 401: Management & Maintenance Requirements, CoBIs Project No. IST-004270, Version 1.0 (Jan. 2005), 21 pgs.

Decasper, D. et al., "Router Plugins: A Software Architecture For Next Generation Routers", Computer Communication Review (Oct. 1998), pp. 229-240.

Bellavista, P., et al., "The Ubiquitous Provisioning of Internet Services to Portable Devices", Pervasive Computing, Jul. 2002, pp. 81-87.

Chatterjee, M., et al., "WCA: A Weighted Clustering Alogrithm for Mobile Ad Hoc Networks", Cluster Computing 5, Klluwer Academic Publishers, 2002, pp. 193-204.

Greenstein, B., et al., "A Sensor Network Application Construction Kit (SNACK)", SenSys '04, Nov. 3-5, 2004, 12 pages.

"The OSGi Service Platform- Dynamic services for networked devices", Retrieved Nov. 16, 2005 from http://www.osgi.org/osgi_technology/index.asp?section=2, 5 pgs.

"TINYOS: Mission Statement", Retrieved Nov. 16, 2005 from http://www.tinyos.net/special/mission, 2 pgs.

Bandara, A., et al., "An Ontological Framework for Semantic Description of Devices", Nov. 11, 2004, 2 pgs.

Vasudevan, S. et al., "Design and Analysis of a Leader Election Algorithm for Mobile Ad Hoc Networks", Proceedings of 12th IEEE ICNP, Oct. 8, 2004, 11 pages.

Liu, J., et al., "QoS-aware Service Location in Mobile Ad-Hoc Networks", Proceedings of the 5th International Conference on Mobile Data Management, Berkeley, CA USA, Jan. 2004, 12 pages.

Liu, J., et al., "Group Management for Mobile Ad Hoc Networks: Design, Implementation and Experiment", Proceedings of the 6th International Conference on Mobile Data Management, Ayia Napa Cyprus, May 13, 2005, 8 pages.

Gounaris, A., et al., "Adaptive Query Processing: A Survey", Lecture Notes In Computer Science, vol. 2405, Archive of Proceedings of the 19th British National Conference on Databases: Advances in Databases, 2002, pp. 11-25.

Skouteli, C., et al., "Concept-Based Discovery of Mobile Services", Proceedings of the 6th International Conference on Mobile Data Management, Ayia Napa Cyprus, May 13, 2005, 5 pages.

Yao, Y., et al., "Query Processing for Sensor Networks", Proceedings of the 2003 CIDR Conference, Jan. 2003, 12 pages.

Spiess, P., et al., "Going Beyond Auto-ID: A Service-oriented Smart Items Infrastructure", Journal of Enterprise Information Management, vol. 20, Issue 3 (2007), pp. 1-9.

"Composite Capability/Preference Profiles (CC/PP): Structure and Vocabularies 1.0", W3C Recommendation (Jan. 15, 2004), pp. 1-78.

"FIPA Device Ontology Specification", Foundation for Intelligent Physical Agents (Apr. 9, 2001), pp. 1-15.

Levis, P. et al., "TinyOS: An Operating System for Sensor Networks", Feb. 17, 2004, pp. 1-32.

Hill, J. L., "System Architecture for Wireless Sensor Networks", Dissertation of Jason L. Hill, University of California, Berkeley (2003), 196 pages.

Casati, Fabio, et al, "Specification and Implementation of Exceptions in Workflow Management Systems", ACM Transactions on Database Systems, vol. 24, No. 3, Sep. 1993, pp. 405-451.

Anke, J. et al., "A Planning Method for Component Placement in Smart Item Environments Using Heuristic Search", Proceedings 7th IFIP WG 6.1 International Conference, Distributed Applications and Interoperable Systems, Jun. 2007, pp. 309-322.

Anke, J. et al., "Cost-based Deployment Planning for Components in Smart Item Environments", IEEE Conference on Emerging Technologies and Factory Automation, Sep. 2006, pp. 1238-1245.

Paradis, L. et al., "A survey of Fault Management in Wireless Sensor Networks", Journal of Network and systems management, Kluwer Academic Publishers, NE, vol. 15 No. 2, Mar. 13, 2007, pp. 171-190.

Yoonhee, K. et al., "Wapee: A Fault-Tolerant Semantic Middleware in Ubiquitous Computing Environments", Proceedings of EUC Workshops, 2006, pp. 173-182.

Benatallah, Boualem, "Facilitating the Rapid Development and Scalable Orchestration of Composite Web Services", 2005 Springer Science + Business Media, Inc., pp. 1-33.

Wiemann, M. et al., "A Service And Device Monitoring Service For Smart Items Infrastructures", Third International Conference On Wireless and Mobile Communications 2007, ICWMC, 6 pages.

Hwang, S-Y, et al, "Personal Workflows: Modeling and Management", MDM 2003, LNCS 2574, pp. 141-152.

Sheng, Q. Z.., et al, "Enabling Personalized Composition and Adaptive Provisioning of Web Services", CAiSE 2004, LNCS 2084, pp. 322-337.

Tolksdorf, R., "Coordination Technology for Workflows on the Web: Workspace", Coordination 2000, LNCS 1906, Springer-Verlag Berlin Heidelberg 2000, pp. 36-50.

Final Office Action mailed Jun. 25, 2008 for U.S. Appl. No. 11/284,195, 31 pgs.

Final Office Action mailed Feb. 23, 2009 for U.S. Appl. No. 11/479,284, 29 pgs.

Non-Final Office Action mailed May 14, 2008 for U.S. Appl. No. 11/479,284, 16 pgs.
Non-Final Office Action mailed Nov. 1, 2007 for U.S. Appl. No. 11/284,195, 14 pgs.
Advisory Action mailed Oct. 9, 2008 for U.S. Appl. No. 11/284,195, 4 pgs.
Non-Final Office Action mailed Oct. 28, 2008 for U.S. Appl. No. 11/283,618, 35 pgs.
Final Office Action mailed May 13, 2009 for U.S. Appl. No. 11/283,618, 32 pgs.
Non-Final Office Action for U.S. Appl. No. 11/443,549, mailed on Aug. 13, 2009, 18 pages.
Non-Final Office Action for U.S. Appl. No. 11/396,299, mailed on Jul. 9, 2009, 15 pages.
Non-Final Office Action for U.S. Appl. No. 11/444,119, mailed on Feb. 27, 2009, 23 Pages.
Non Final Office Action for U.S. Appl. No. 11/444,119, mailed on Aug. 28, 2009, 19 pages.
Restriction Requirement for U.S. Appl. No. 11/444,279, mailed on May 5, 2009, 5 pages.
U.S. Appl. No. 11/810,357, filed Jun. 5, 2007.
Ardaiz, et al, "On Service Deployment in Ubiquitous Computing", Proceedings of the 2nd International Workshop on Ubiquitous Computing and Communications, Sep. 2001, 7 pages.
Arkin, et al, "Web Services Business Process Execution Language Version 2.0", Committee Draft, Sep. 2005, 81 pages.
Arkin, et al, "Web Service Choreography Interface (WSCI) Version 1.0", W3C Note, Aug. 2002, 84 pages.
Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.
Box, et al, "Web Services Eventing (WS-Eventing)", Aug. 2004, 16 pages.
Crossbow, "Wireless Sensor Networks: Sensor and Data-Acquisition Boards", retrieved on Apr. 24, 2005 from http://www.xbow.com/Products/productsdetails.aspx?sid=63, 1 page.
Crossbow, "Stargate: X-Scale Processor Platform SPB 400", retrieved on Dec. 20, 2005 from http://www.xbow.com/Products/productsdetails.aspx?sid=63, 2 pages.
Clement, et al, "UDDI version 3.2, UDDI Spec Technical Committee Draft, OASIS, UDDI Spec TC", Oct. 2004, 420 pages.
Christensen, et al, "Web Services Description Language (WSDLl) 1.1", W3C Note, Mar. 2001, 27 pages.
Chackrabarti, et al, "Securing the Pharmaceutical Supply Chain", Technical Report, Auto-ID Centre Institute for Manufacturing, University of Cambridge, Jun. 1, 2003, 19 pages.
California Software Laboratories, "White Paper: The JetSend Appliance Architecture", retrieved from http://www.calsoftlabs.com/whitepapers/jetsend-architecture.html, 2002, 28 pages.
Davenport, "Process Innovation: Reengineering work through information technology", Harvard Business School Press, 1993, 6 pages.
de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.
Decker, et al, "CoBIs Platform Survey and State-of-the-Art Sensor Platforms", CoBIs Deliverable Report, Aug. 2005, 51 pages.
Deering, et al, "Internet Protocol, Version 6 (Ipv6) Specification", Network Working Group, Dec. 1998, 39 pages.
Gauger, "FlexCup—Flexible and Efficient Code Updates for Sensor Networks", Summer School on Wireless Sensor Networks and Smart Objects; Universität Stuttgart, Aug. 29-Sep. 3, 2005, 8 pages.
Geller, et al, "Web Services Eventing (WS-Eventing)", Aug. 2004, 38 pages.
Gudgin, et al, "SOAP Message Transmission Optimization Mechanism", Jan. 25, 2005, 15 pages.
Guttman, "Service Location Protocol", Version 2, Jun. 1999, 55 pages.
Haas, "Service Deployment in Programmable Networks", PhD Thesis, ETH Zurich, Switzerland, 2003, 253 pages.

Hammer, et al, "Reengineering the Corporation—A Manifesto for Business Revolution", Nicholas Brealey Publishing, May 1994, 14 pages.
Han, et al, "Sensor Network Software Update Management: A Survey", Journal of Network Management, 2005, 26 pages.
Intel Research, "An Introduction to Wireless Sensor Networks", Technical Report, 2004, 6 pages.
Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.
Kim, et al, "A leader election algorithm in a distributed computing system", 5th IEEE Workshop on Future Trends of Distributed Computing Systems, 1995, 5 pages.
Kiselyov, "Functional XML parsing framework: SAX/DOM and SXML parsers with support for XML Namespaces and validation", 2001, 42 pages.
Lampe, et al, "A ubiquitous computing environment for aircraft maintenance", SAC '04: Proceedings of the 2004 ACM Symposium on Applied Computing, 2004, pp. 1586-1592.
Law, et al, "Assessing Security-Critical Energy-Efficient Sensor Networks", 2002, 10 pages.
Malpani, et al, "Leader election algorithms for mobile ad hoc networks", Proceedings of the 4th international Workshop on Discrete Algorithms and Methods For Mobile Computing and Communications, Aug. 11, 2000, pp. 96-103.
Nochta, et al, "Relocatable services and service classification scheme", Authorization Level: Public (PU) Version 1.0, Feb. 2005, 59 pages.
Nokia, "Nokia Intellisync Device Management", Overview for IT Managers, May 2007, 19 pages.
"OSGI Service Platform", Release 3, IOS Press, Mar. 2003, 602 pages.
Parikh, et al, "Security in Sensor Networks", CS 588: Cryptography, 2001, 28 pages.
Park, "Specification of the Bluetooth System: Wireless connections made easy", Covered Core Package version: 1.2, Nov. 2003, 1200 pages.
Passing, "Profiling, Monitoring and Tracing in SAP WebAS", SAP Library, Jun. 22, 2005, 9 pages.
Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, 1981, 21 pgaes.
Postel, "Internet Protocol", Protocol Specification, Request for Comments RFC 791, 1983, 51 pages.
Postel, "Transmission Control Protocol", Protocol Specification, Request for Comments RFC 793, 1981, 91 pages.
Postel, "User Datagram Protocol", Protocol Specification, Request for Comment, RFC 768, Information Sciences Institute, 1981, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Providing the foundation to enable and manage change", retrieved on Nov. 10, 2005 from http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.
SAX, "About SAX", retrieved on Jan. 6, 2006 from http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.

Schneier, "Applied Cryptography", 2nd edition, John Wiley & Sons, Inc., 1996, 18 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2ME™) Specification Version 1.1, Mar. 2003, 60 pages.
Sun Microsystems, "Jini Architecture Specification", Version 1.2, Dec. 2001, 26 pages.
Sun Microsystems, "Sun Spot System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network—based Ambient Intelligent Environments", Header Background Image, 12(3), 2006, 13 pages.
Waldo, "The Jini architecture for network-centric computing", Communications of the ACM archive, vol. 42, Issue 7, Jul. 1999, pp. 76-82.
Wander et al, "Energy Analysis of Public-Key Cryptography for Wireless Sensor Networks", UC Santa Cruz, Sun Microsystems Laboratories, 2005, 5 pages.
Wang, et al, "Timing Analysis of Real-Time Networked RFID Systems", Cambridge Auto-ID Lab, Cambridge UK, 2004, 4 pages.
Warneke, et al, "Smart dust: Communicating with a cubic-millimeter computer", Computer, 34(1), 2001, pp. 44-51.
Weiser, "The computer for the 21st century", ACM SIGMOBILE Mobile Computing and Communications Review archive, vol. 3, Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Office Action for CN Application No. 200710108723.3 (with English Translation), mailed May 21, 2010, 11 pages.
Office Action for CN Application No. 200610149268.7 (with English Translation), mailed Mar. 1, 2010, 16 pages.
Office Action for CN Application No. 200610149270.4 (with English Translation), mailed Mar. 1, 2010, 18 pages.
Office Action for JP Application No. 2006-314565 (with English Translation), mailed Feb. 12, 2010, 9 pages.
Graupner, et al, "A Framework for Analyzing and Organizing Complex Systems", Hewlett Packard, Computer Systems and Technology Laboratory, Feb. 6, 2001, 17 pages.
Krause, et al, "Near-Optimal Sensor Placements: Maximizing Information While Minimizing Communication Cost", IPSN '06, Apr. 19-21, 2006, pp. 2-10.
Perkins, "IP Mobility Support for IPv4", Network Working Group, Nokia Research Center, Aug. 2002, 23 pages.
Office Action for CN Application No. 200710108722.9 (with English Translation), mailed Jun. 2, 2010, 9 pages.
Final Office Action for U.S. Appl. No. 11/283,618, mailed Oct. 5, 2010, 26 pages.
Non-Final Office Action for U.S. Appl. No. 11/283,618, mailed May 24, 2010, 42 pages.
Final Office Action for U.S. Appl. No. 11/396,299, mailed Jan. 28, 2010, 54 pages.
Notice of Allowance for U.S. Appl. No. 11/413,230, mailed Oct. 13, 2010, 14 pages.
Non-Final Office Action for U.S. Appl. No. 11/413,230, mailed Apr. 27, 2010, 24 pages.
Final Office Action for U.S. Appl. No. 11/433,621, mailed Dec. 23, 2010, 40 pages.
Final Office Action for U.S. Appl. No. 11/443,549, mailed Mar. 17, 2010, 42 pages.
Final Office Action for U.S. Appl. No. 11/444,119, mailed Aug. 24, 2010, 28 pages.
Non-Final Office Action for U.S. Appl. No. 11/444,119, mailed Mar. 30, 2010, 45 pages.
Final Office Action for U.S. Appl. No. 11/444,279, mailed Sep. 10, 2010, 26 pages.
Non-Final Office Action for U.S. Appl. No. 11/444,279, mailed Mar. 22, 2010, 46 pages.
Notice of Allowance for U.S. Appl. No. 11/479,284, mailed on Oct. 13, 2010, 19 pages.
Notice of Allowance for U.S. Appl. No. 11/479,284, mailed on May 13, 2010, 30 pages.
Non-Final Office Action for U.S. Appl. No. 11/479,284, mailed Aug. 11, 2010, 19 pages.
Non-Final Office Action for U.S. Appl. No. 11/496,641, mailed Jul. 29, 2010, 63 pages.
Non-Final Office Action for U.S. Appl. No. 11/810,357, mailed Apr. 26, 2010, 44 pages.
Non-Final Office Action for U.S. Appl. No. 11/871,616, mailed Mar. 9, 2010, 46 pages.
Notice of Allowance for U.S. Appl. No. 11/284,195, mailed Mar. 4, 2011, 46 pages.
Non-Final Office Action for U.S. Appl. No. 11/443,549, mailed Jan. 6, 2011, 33 pages.
Final Office Action for U.S. Appl. No. 11/810,357, mailed Feb. 17, 2011, 38 pages.
Non-Final Office Action for U.S. Appl. No. 11/283,618, mailed Mar. 31, 2011, 33 pages.
Advisory Action for U.S. Appl. No. 11/433,621, mailed Apr. 7, 2011, 4 pages.
Final Office Action Response for U.S. Appl. No. 11/433,621, filed Mar. 23, 2011, 14 pages.
Notice of Allowance for U.S. Appl. No. 11/444,119, mailed Apr. 1, 2011, 50 pages.
Non-Final Office Action for U.S. Appl. No. 11/444,279, mailed Apr. 28, 2011, 36 pages.
Final Office Action Response for U.S. Appl. No. 11/810,357, filed Apr. 14, 2011, 18 pages.
Advisory Action for U.S. Appl. No. 11/810,357, mailed Apr. 28, 2011, 7 pages.
Notice of Allowance for U.S. Appl. No. 11/444,119, mailed Oct. 5, 2011, 17 pages.
Final Office Action for U.S. Appl. No. 11/283,618, mailed Sep. 29, 2011, 32 pages.
Non-Final Office Action Response for U.S. Appl. No. 11/496,641, filed on Sep. 7, 2011, 13 pages.
Non-Final Office Action for U.S. Appl. No. 11/496,641, mailed on Jun. 7, 2011, 37 pages.
US 7,801,983, 09/2010, Bornhoevd et al. (withdrawn)

* cited by examiner

136 ↙

| 402 LSM ID | 404 Community | 406 Devices | 408 Services | 410 Location |
|---|---|---|---|---|
| LSM 1 | Facility Safety Management | Sensor x with capabilities a, b, c | Temperature and vibration service | Warehouse A |

| 412 Group ID | 414 Group members | 416 Services | 418 QoS | 420 Location |
|---|---|---|---|---|
| Group 1 | PDA with capabilities d, e, f<br><br>Sensor node with resources g, h, i | Display service<br><br>Temperature service | Current resource usage of group | Warehouse A: Area 1 |

FIG. 4B

```xml
<xs:schema
 xmlns:xs="http://www.w3.org/2001/XMLSchema">1102
<xs:element name="Service">
 <xs:complexType>
  <xs:sequence>
    <xsd:element name="TechnicalRequirements" maxOccurs="unbounded">  1104
       <xs:complexType>
       <xs:sequence>
          <xs:element name="Memory" type="xs:string"/>
          <xs:element name="CPU" maxOccurs="unbounded ">
              <xs:complexType>
              <xs:sequence>
                 <xs:element name="CPUSpeed" type="xs:string"/>
                 <xs:element name="CPUArchitecture"
                                         type="xs:string"/>
              </xs:sequence>
              </xs:complexType>
           <xs:element name="Battery" type="xs:decimal"/>
          <xs:element name="Platform" maxOccurs="unbounded">
              <xs:complexType>
              <xs:sequence>
                 <xs:element name="OS" type="xs:string"/>
                 <xs:element name="OSVersion" type="xs:decimal"/>
                  <xs:element name="JVMVersion" type="xs:decimal"/>
              </xs:sequence>
              </xs:complexType>
           <xs:element name="Connection" maxOccurs="unbounded">
              <xs:complexType>
              <xs:sequence>
                 <xs:element name="ConnectionType" type="xs:string"/>
                 <xs:element name="ConnectionSpeed"
                                         type="xs:stringl"/>
                 <xs:element name="JVMVersion" type="xs:decimal"/>
              </xs:sequence>
              </xs:complexType>

</xs:sequence>
       </xs:complexType>
  </xs:sequence>
  </xs:complexType>

</xs:element>
</xs:schema>
```

FIG. 11

```
<Service>
    <TechnicalRequirements>                    ←—1202
        <Memory>300MB</Memory>
        <CPU>
            <CPUSpeed>200MHZ</CPUSpeed>
            <CPUArchitecture>RISC</CPUArchitecture>
        </CPU>
        <Battery>80</Battery>
        <Platform>
            <OS>Linux</OS>
            <OSVersion>9.0</OSVersion>
            <JVMVersion>1.4</JVMVersion>
        </Platform>
        <Connection>
            <connectionType>WLAN</connectionType>
            <connectionSpeed>54 MBit/s</connectionSpeed>
        </Connection>
    </TechnicalRequirements>
</Service>
```

FIG. 12

```
<xs:schema
 xmlns:xs="http://www.w3.org/2001/XMLSchema">       ←—1302
<xs:element name="Device">
 <xs:complexType>
  <xs:sequence>
     <xsd:element name="Description" maxOccurs="unbounded">    ←—1304
          <xs:complexType>
          <xs:sequence>
               <xs:element name="Name" type="xs:string"/>
               <xs:element name="Type" type="xs:string">
               <xs:element name="Vendor" type="xs:string"/>
          </xs:sequence>
          </xs:complexType>
     <xs:element name="HardwareDescription" maxOccurs="unbounded">
          <xs:complexType>
          <xs:sequence>
              <xs:element name="CPUDescription" maxOccurs="unbounded">
              <xs:complexType>
              <xs:sequence>
                   <xs:element name="CPUName" type="xs:string"/>
                   <xs:element name="CPUSpeed" type="xs:string"/>
              </xs:sequence>
              </xs:complexType>
                <xs:element name="Connection" maxOccurs="unbounded">
                   <xs:complexType>
                   <xs:sequence>
                    <xs:element name="ConnectionType" type="xs:string"/>
                    <xs:element name="ConnectionSpeed" type="xs:stringl"/>
                   </xs:sequence>
                   </xs:complexType>
              <xs:element name="MemoryDescription"
                                             maxOccurs="unbounded">
                   <xs:complexType>
                   <xs:sequence>
                       <xs:element name="totalMemory" type="xs:string"/>
                       <xs:element name="freeMemory" type="xs:stringl"/>
                   </xs:sequence>
                   </xs:complexType>
          </xs:sequence>
          </xs:complexType>
```

FIG. 13

```xml
<Device>
    <Description>
        <Name>Stargate</Name>                    ←—1402
        <Type>Server</Type>
        <Vendor>SAP</vendor>
    </Description>
    <HardwareDescription>
        <CPUDescription>
            <CPUName>AMD</CPUName>
            <CPUSpeed>1GHz</CPUSpeed>
        </CPUDescription>
        <Connection>                              ←—1404
            <ConnectType>WLAN</connectType>
            <ConnectSpeed>54 MBit/s</connectSpeed>
        </Connection>
        <MemoryDescription>
            <TotalMemory>65MB</totalMemory>
            <FreeMemory>20MB</freeMemory>
        </MemoryDescription>
    </HardwareDescription>
    <SoftwareDescription>
        <OSDescription>
            <OSName>Linux</OSName>
            <OSVersion>9.3</OSVersion>
            <OSVendor>                            ←—1406
                <OSVenName>Suse</OSVenName>
                <OSVenURL>www.novell.com</OSVenURL>
            </OSVendor>
        </OSDescription>
        <Services>
            <ServiceURL>service.xml</ServiceURL>
        </Services>
    </SoftwareDescription>
    <DeviceStatus>
        <Location>Room A</Location>               ←—1408
        <CPUUsage>30%</CPUUsage>
        <PowerDetails>
            <RemainPowerLevel>400min</remainPowerLevel>
        </PowerDetails>
    </DeviceStatus>
</Device>
```

FIG. 14

HIERARCHICAL, MULTI-TIERED MAPPING AND MONITORING ARCHITECTURE FOR SERVICE-TO-DEVICE RE-MAPPING FOR SMART ITEMS

CROSS-REFERENCE TO RELATED APPLICATION

This application is a continuation of, and claims priority under 35 U.S.C. §120 to, U.S. application Ser. No. 11/284,195, filed Nov. 21, 2005, titled "SERVICE-TO-DEVICE RE-MAPPING FOR SMART ITEMS," which is incorporated herein by reference in its entirety.

TECHNICAL FIELD

This description relates to smart item technologies.

BACKGROUND

Smart item technologies may include, for example, radio-frequency identification (RFID) systems, embedded systems, sensor motes, and/or sensor networks, and may be used, for example, to provide business software applications with fast access to real-world data. For example, smart item technologies may be used support the detection, reading, or writing of RFID tags, as well as to support communication with, and control of, wireless sensor networks and embedded systems. In many instances, smart items may include devices having local processing power, memory, and/or communication capabilities, that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart item devices include an RFID tag, which may be passive or active, and which may be attached to an object and used to provide product or handling information related to the object. Other examples of smart item devices includes various sensors, such as, for example, environmental sensors (e.g., a temperature, humidity, or vibration sensor), which, as just referenced, may be capable of communicating to form one or more sensor networks. These and other types of smart item devices also may include embedded systems, which may refer generally to any system in which a special-purpose processor and/or program is included, and/or in which the system is encapsulated in the device being controlled.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

SUMMARY

According to one general aspect, a motivation for re-deployment of a service executing on an originating device is determined. The service is mapped to a selected device from among a plurality of devices that includes the originating device and the selected device. The service is re-deployed on the selected device.

Implementations may include one or more of the following features. For example, in determining a motivation for re-deployment of a service, device metadata associated with the originating device and indicating that the originating device currently has insufficient device characteristics to continue adequately executing the service may be determined, based on service metadata associated with the service.

Determining a motivation for re-deployment of a service may include determining that the selected device is available for re-deployment of the service, and determining device metadata associated with the originating device and/or the selected device that indicates that the selected device is better able to execute the service. Determining a motivation for re-deployment of a service may include determining that a time limit for deployment of the service on the originating device has been reached.

Mapping the service to a selected device may include determining service metadata associated with the service, determining device metadata associated with each of the plurality of devices, and mapping the service to the selected device, based on the service metadata and the device metadata. Mapping the service to a selected device may include determining service metadata associated with the service, the service metadata including a mobility description associated with the service and describing a nature and/or extent of allowed re-deployment of the service.

In mapping the service to a selected device, a current state of the service as the service is executing on the originating device may be determined. Further, in mapping the service to a selected device, it may be determined that the selected device is associated with a device characteristic that meets or exceeds a threshold parameter required for the re-deploying to occur. Mapping the service to a selected device may include imposing a time limit to be met before the service may be re-deployed from the selected device back to the originating device, or to another device of the plurality of devices.

Re-deploying the service on the selected device comprises re-instating, on the selected device, a state of the service on the originating device prior to the re-deploying. Re-deploying the service on the selected device may include stopping execution of the service on the originating device, and removing a service executable of the service from the originating device. Re-deploying the service on the selected device may include obtaining a service executable of the service from a service repository for deploying on the selected device.

According to another general aspect, a system includes a system monitor that is operable to monitor an originating device of a plurality of devices, the originating device executing a service, and a service mapper that is operable to determine a motivation for re-deployment of the service, based on an output of the system monitor, and further operable to re-deploy the service to a selected device of the plurality of devices, based on the motivation.

Implementations may include one or more of the following features. For example, the system monitor may include a system monitor component installed on the originating device and operable to report device characteristics of the originating device to the service mapper.

The output of the system monitor may include current device metadata, including device characteristics, of the originating device. The motivation may include a determination that the originating device is not the best-suited of the plurality of devices to execute the service.

The service mapper may be operable to implement the re-deployment of the service based on an application of a re-mapping rule to the output of the system monitor. The service mapper may be operable to reinstate a state of the service on the originating device at a time prior to the re-deployment, based on a data file storing state information for the service.

The system may include a service repository that is operable to store at least the service in association with service metadata describing service requirements of the service, wherein the service mapper is operable to re-deploy the service to the selected device from the service repository. The service mapper may be operable to re-deploy the service, based on service metadata that includes service requirements of the service.

The details of one or more implementations are set forth in the accompanying drawings and the description below. Other features will be apparent from the description and drawings, and from the claims.

BRIEF DESCRIPTION OF THE DRAWINGS

FIGS. 4A and 4B are tables illustrating a global service mapper table and a local service mapper table, respectively.

FIG. 11 is an example file format for representing service metadata.

FIG. 12 is an example service metadata file using the format of FIG. 11.

FIG. 13 is an example file format for representing device metadata.

FIG. 14 is an example device metadata file using the format of FIG. 13.

DETAILED DESCRIPTION

Figure 1:
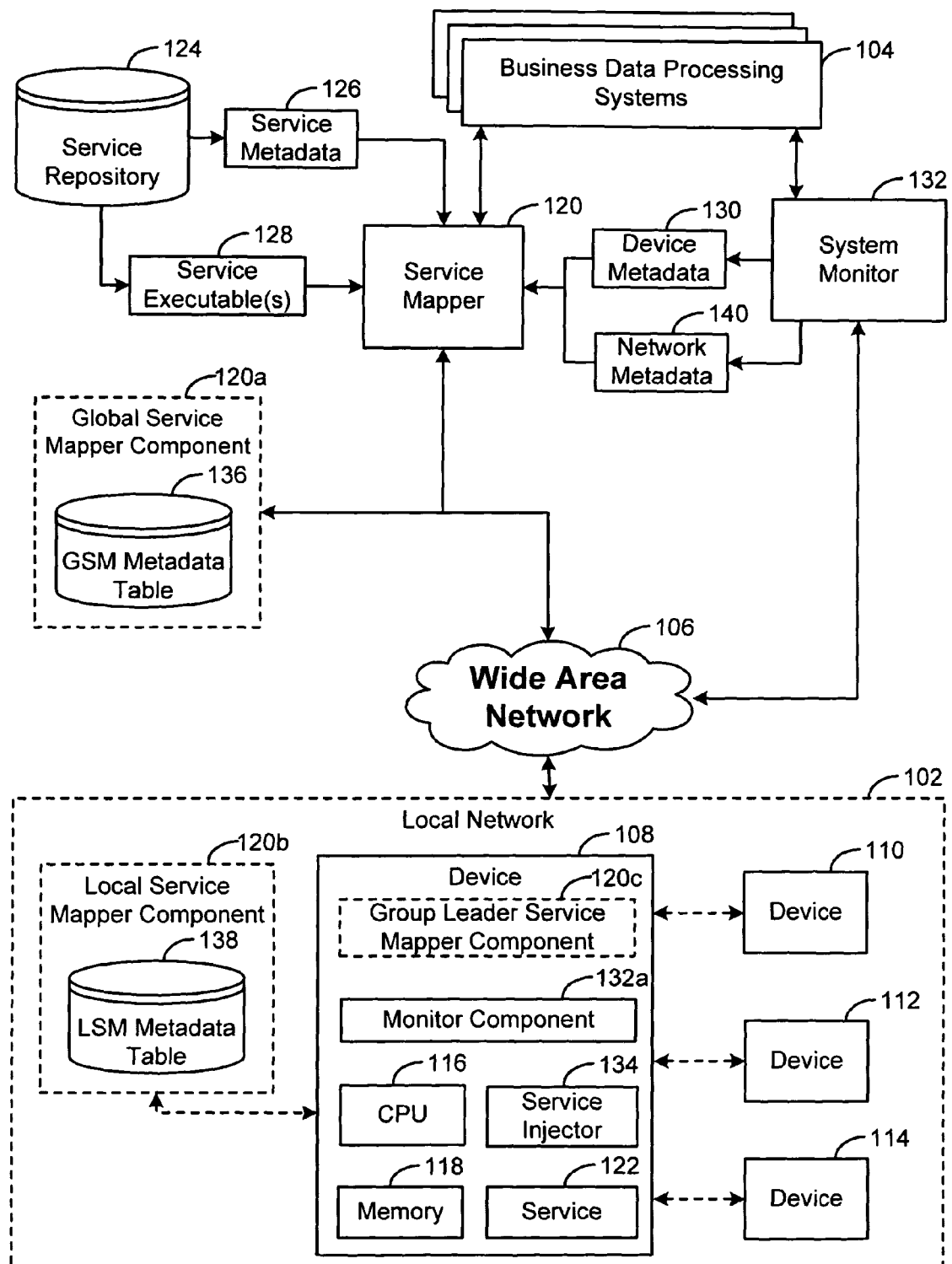
FIG. 1 is a block diagram of a system for service-to-device mapping for smart item devices.

FIG. 1 is a block diagram of a system 100 for service-to-device mapping for smart item devices. In the example of FIG. 1, a local network 102 that includes various smart item devices provides real-world data to one or more business data processing systems 104 in a timely and accurate manner, using a wide area network 106. For example, the local network 102 may include smart item devices 108, 110, 112, and 114, referred to herein as "smart items" or simply as "devices," which may include RFID readers (for reading objects having an RFID tag), various embedded systems, and/or various types of sensors and/or sensor motes.

In FIG. 1, the device 108 is illustrated as including a central processing unit (CPU) 116, as well as a memory 118. Thus, the device 108 should be understood to be capable of various levels of computing capabilities, including, for example, processing or transmitting sensed data (in the case where the device 108 includes a sensor). Although not specifically illustrated in FIG. 1 for the sake of clarity, it should be understood that the devices 110, 112, and 114 also may include the same or different computing capabilities, including, for example, the capability to form and participate in the local network 102, such as a wireless network and/or a peer-to-peer network.

Thus, the local network 102 may be used to collect, process, filter, aggregate, or transmit data that may be useful to the business data processing systems 104. For example, the business data processing systems 104 may include inventory management systems, supply chain management systems, retail store management systems, warehouse management systems, and any other system(s) that may be used to execute business processes with respect to real-world objects, where such real-world objects may include, for example, products for sale, pallets or other shipment elements, patients, or manufacturing materials/equipment. By tracking and analyzing such real-world objects, the business data processing systems 104 may be used, for example, to determine inventory levels, set pricing levels, evaluate marketing strategies, evaluate manufacturing or production technologies, reduce theft, or maintain safety.

By including smart items as the devices 108, 110, 112, and 114 of the local network 102, processing may be performed very early in the data-collection process(es), so that a burden placed on the business data processing applications 104 may be reduced or eliminated. For example, the business data processing applications 104 may be located at a corporate headquarters, and the local network 102 may represent one of many (types of) networks that may be dispersed across a large geographical region connected by the wide area network 106. As such, for example, the business data processing systems 104 may only require certain sub-sets or characterizations of data collected by the network 102 (and related networks), and may not need or want all collected data.

In some implementations, the business data processing systems 104 may include compound or composite applications that are made from re-usable software components or services that are designed to perform some well-defined task(s). Also, in these or other implementations, the business data processing systems 104 may include legacy applications that may not easily communicate with data-collection devices (or with other business data processing systems), and, in such cases, services or service components may be provided as interfaces between the legacy applications and the data collection devices and/or other systems. The system 100 allows these and other applications and services to be deployed directly on the devices 108, 110, 112, and 114, so that, for example, services may be run on the devices (and data may be collected and/or processed) in a timely, efficient, reliable, automated, cost-effective, and scaleable manner. Thus, for example, business processes may be decomposed into individual services and deployed at different devices.

The system 100 includes a service mapper 120 that is operable to select the device 108 as a selected device from among the plurality of devices 108, 110, 112, and 114 of the network 102, for deploying a service 122 thereon, as shown. In so doing, the service mapper 120 accesses a service repository 124 that is operable to store a plurality of services that are eligible for execution within the local network 102 and/or other networks (not shown in FIG. 1). The service mapper 120 determines service metadata 126 along with an actual service executable 128, and compares the service metadata 126 against device metadata 130 associated with each of the plurality of devices 108, 110, 112, and 114. Based at least on the service metadata 126 and the device metadata 130, the service mapper 120 may select the device 108 as being particularly well-suited for deployment of the service 122 (including the service executable 128) thereon.

For example, the device metadata 130 may include a description of each device, the description being constructed according to an ontology and/or schema that is known to the service mapper 120 and common to the various devices 108, 110, 112, and 114. Additionally, or alternatively, the device metadata 130 may be collected in a device-specific format or structure for each of the devices 108, 110, 112, and 114, e.g., by a system monitor 132, and may thereafter be converted into such a common schema for use by the service mapper 120. For example, the device metadata may include a description of various technical capabilities of the devices 108, 110, 112, and 114, provided in an extensible Markup Language (XML)-based language, e.g., by using an XML schema, as described in more detail, below. Of course, other formats, languages, and/or structures may be used, as well.

More generally, the device metadata 130 may include, for example, a device description, a software description, a hardware description, and a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 116 (e.g., name or speed), memory 118 (e.g., total and/or free amount of memory), or connection capabilities (e.g., connection speed or connection type) of the device(s). The device status may include more volatile information, including a device location, current CPU usage, or remaining power or memory. Of course, other device aspects or information may be included in the device metadata 130, as described below and/or as would be apparent. For example, the device metadata 130 may include information about other devices, such as where the device 108 includes an RFID reader, and the device metadata 130 may include a description of types of RFID tags that may be read and/or written to by the RFID reader.

The service metadata 126 may somewhat analogously include various service descriptions and/or requirements that relate to whether and how the service(s) may be executed on one or more devices. For example, the service metadata may include a service behavior description, technical constraints of the service, or information regarding input, output, preconditions, or effects (IOPE) of the service. For example, technical constraints may include a required CPU type or speed, an amount of (free) memory that is needed, a type or speed of connection that is required or preferred, an operating system version/name/description, or a type or status of a battery or other device power source(s).

Thus, as with the device metadata 130, distinctions may be made between static and dynamic service requirements, such as hardware requirements. For example, a static value such as a total memory or maximum processing speed may be included, along with dynamic values such as available memory/processing/power and/or a number or type of other services that may be allowed to concurrently run on a device together with the service(s) in question, at an execution time of the service(s).

Construction and use of the service metadata 126 may differ depending on whether the service(s) are considered to be a compound service and/or an atomic service. In this regard, an atomic service refers to a discrete service that runs on a single device, while a compound service refers to a higher-level service that includes and combines one or more atomic services. For example, a compound service may be deployed onto the local network 102 that requires a certain number or type of the devices 108, 110, 112, or 114, in order to provide a cumulative or aggregated function(s), and an atomic service may refer to services, such as the service 122, that are deployed to individual ones of the devices 108, 110, 112, or 114. For example, the devices 108, 110, 112, and 114 may include temperature sensors dispersed in a defined area to determine a temperature distribution or gradient in the area, in which case each of the devices 108, 110, 112, or 114 may execute a temperature-collection service (e.g., the service 122 on the device 108), while one or more of the devices 108, 110, 112, or 114, or some other device, may execute a compound service that aggregates the temperature data from all of the devices 108, 110, 112 and 114 and determines information about the temperature distribution or gradient. Thus, for example, it should be understood that part of the service metadata 126 for a compound service may include information regarding atomic services that comprise the compound service.

Further, for compound services, abstract constraints such as a density for a service (e.g., a deployment of the compound service at every 5 $qm^2$) may be included in the service metadata 126, and may need to be translated into a concrete requirement for atomic services involved in the compound service. For instance, the abstract density constraint just mentioned may result in a concrete requirement for atomic services of the corresponding compound service, in which the atomic services are deployed on 10% of all available devices.

Thus, a translation process may be used to translate an abstract constraint of a compound service into a concrete service requirement for corresponding atomic services, in the specific context of a given system (e.g., the system 100). Such a translation process may determine an abstract constraint of the compound service and translate the abstract constraint into a concrete requirement, based on information regarding the system at hand (e.g., the system 100). To the extent that the atomic services for the compound service communicate and work together, it may be reasonable to ensure that the concrete value is the same for all of the atomic services. For example, where the compound service is associated with an abstract constraint of being deployed at every 5 $qm^2$, then system information may be applied, such as that a size of a field of the system is 100 $qm^2$, with every 5 $qm^2$ containing ten devices, so that forty devices cover the entire field. Then, the abstract constraint of deployment of the compound service at every 5 $qm^2$ results in a deployment density of 10% for the corresponding atomic services. That is, in this case, four of the forty devices (10%) will run the compound service and/or the corresponding atomic services, with one device having the service(s) deployed thereon in each 5 qm×5 qm field of the entire 100 $qm^2$ field.

More generally, using at least the service metadata 126 and the device metadata 130, the service mapper 120 may map a given service onto the devices 108, 110, 112, or 114 of the local network 102. Such a mapping is designed not only to value-match various aspects of the service metadata 126 and the device metadata 130, where necessary (e.g., matching a required memory specified in the service metadata 126 with a device memory specified in the device metadata 130), but also to enable and optimize a deployment and execution of the service in question. For example, it may be the case that both the device 108 and the device 110 are nominally or ostensibly capable of running the service 122 (e.g., both devices 108 and 110 may posses some minimum required values of memory, processing capabilities, or power). However, it may be the case that the service 122 is more power-hungry than memory-hungry (or vice-versa), so that the service mapper 120 may map the service 122 to the device 108 if the device 108 is currently able to provide more power relative to the other candidate device 110, even if the device 110 currently provides more free memory than the device 108.

More formally, a matching set may be expressed as a function that compares device metadata (e.g., device profiles) for a set of devices with service metadata (e.g., technical requirements) for a service to be deployed. Specifically, a set $D_{cap}$ may be defined as a set of all available individual device profiles "d," while $s_{tec}$ may refer to technical requirements of the service in question. Then the matching set may be defined in Eq. (1) as:

$$\text{match}(s_{tec}, D_{cap}) = \{d \in D_{cap} | s_{tex} \subseteq d\} \quad \text{Eq. (1)}$$

Thus, a device profile d within the set $D_{cap}$ is accepted as an element of a matching set only if all technical requirements $s_{tec}$ of the service in question are fulfilled.

However, as referenced above, simply matching values of the service metadata 126 with the device metadata 130 may not be sufficient to determine which of the matching or candidate device profiles "d" is qualitatively best-suited to perform the function of the service in question. For example, a performance metric may be applied that assigns a numeric weight to one or more attributes of the device metadata, where the numeric weight(s) may be assigned based on a value of the corresponding attributes to the service in question, so that, for example, the numeric weights may be different for different services (e.g., may be service-specific). For example, such a performance metric may be expressed as in Eq. (2):

$$\text{Val}_d = w_1(\text{CPU\_load}) + w_2(\text{memory}) + w_3(\text{battery}) + w_4(\text{connection\_speed}) \quad \text{Eq. (2)}$$

In Eq. (2), the weighted values $w_1$, $w_2$, $w_3$, and $w_4$ may be selected to equal "1," and/or may otherwise be normalized or modified to take into account any differences in units.

Thus, Eq. (2) may be applied to all available devices (or to all devices within the matching set of Eq. (1)), so that values for $\text{Val}_d$ for each device may be obtained. Then, the device-specific values for $\text{Val}_d$ may be compared to determine a maximum value for all of the devices in question, and an associated device may be selected by the service mapper 120. In this way, a device providing a highest-available quality for performing the service in question may be selected.

Further, the performance metric of the example of Eq. (2) may be extended to cover other device or application-dependent issues. For example, it may be the case that a certain type or brand of device is known to provide some advantage or benefit in executing a service to be deployed, e.g., in terms of reliability. Therefore, for example, all devices of this type or brand may be assigned an appropriate weight and included in the performance metric of Eq. (2), or in a similar performance metric.

Once an appropriate service mapping has been performed, a service injector 134 may be used to install and start the mapped service (e.g., the service 122) on the device 108. The service injector 134 further may more generally be used to manage a life cycle of the service(s), e.g., by performing service updates or stopping the service when necessary.

Thus, one task of the service injector 134 is transferring concrete service code (e.g., an appropriate one of the service executable(s) 128) to the selected device(s). Thus, the service injector 134 receives and installs the kind of code in question. Such an install component as the service injector 134 may be installed on the device-side as either a single standalone software component, or may cooperate with other installation components in order to distribute the service executables 128. In the latter case, for example, if the service mapper 120 cannot reach all selected devices for a required service installation, then service injectors on multiple ones of the devices may communicate with each other to accomplish the installation. After installing the service executable 128, the service 122 may be kept in an inactive state until the service injector sends a start-up signal to change the service to an active state. In a similar way, the service injector 134 may be used to organize the updating and stopping of services.

Once mapping of the service 122 has occurred, and the service 122 has been installed and started on the device 108, then execution of the service 122 may continue, as needed. Over time, however, it may be the case that the device 108 ceases to be the optimal device within the local network 102 for running the service 122. For example, the device 110 may stop running a service of its own, thereby freeing up sufficient memory, processing, or power resources to surpass the device 108 with respect to running the service 122. As another example, the device 112 may represent a device that enters the local network 102 at a certain point in time after deployment of the service 122 on the device 108, and that contains superior resources for running the service 122. For example, the device 108 may be a Personal Digital Assistant (PDA) and the device 112 may be a laptop with superior computing features than the PDA device 108. As a final example, it may be the case that the device 108 begins to run low on its own resources (e.g., a battery power may reach an almost-discharged state), thereby resulting in a potential vulnerability of the local network 102 as a whole, and in one of the device 110, 112, or 114 being considered superior for running the service 122.

Thus, the service mapper 120 is operable to re-map, remove, and re-deploy the service 122 from an originating device such as the device 108 to another selected device, e.g., the device 110, during a run-time of the service 122. In this way, improved device exploitation and improved reliability may be achieved by relocating services from relatively resource-poor devices to more powerful devices. As described in more detail below, determination of available resources at each device may be performed by the system monitor 132, so that decisions regarding when and whether to initiate re-mapping may be made accordingly.

In executing mapping and/or re-mapping, it may be the case that any or all of the business data processing systems 104, service repository, system monitor, local network 102, or devices 108, 110, 112, and 114 may be dispersed from one another across a relatively large geographical area that is connected by the wide area network 106, which may include, for example, the Internet or an enterprise-wide proprietary network. Further, a total number of smart item devices reporting to the business data processing systems 104 may be such that it is impractical or undesirable for the service mapper 120 to individually handle all phases of the service mapping processes for all such devices.

Therefore, components or tiers of the service mapper 120 may be used that vary in terms of, for example, the semantics or descriptions used for the service metadata 126 and/or the device metadata 130, or that vary in terms of available computing power, or that vary in terms of geographical location relative to the business data processing systems 104, the local network 102, and/or the devices 108, 110, 112, or 114. For example, a global service mapper (GSM) component 120*a* may be used that is common to a plurality of local networks similar to the local network 102, and that represents a relatively powerful computing device, such as a workstation or powerful personal computer (PC). Meanwhile, a local service mapper (LSM) component 120b may be used that is specific to the local network 102 and the devices contained therein, such as the devices 108, 110, 112, and 114 (or other devices, not shown). The LSM component 120b may represent a somewhat-less powerful component, such as a Stargate server (described in more detail below) or a PDA. Finally, a group leader service mapper (GLSM) component 120c may be used within the local network 102 that is associated with a group that is a sub-set of all devices of the local network 102. The GLSM component 120c may thus be implemented by one of the devices of the local network (e.g., the device 108, as shown, such as a sensor node), which may generally have the least amount of computing resources of the various service mapper components 120a, 120b, and 120c. One example of an implementation of such a hierarchical architecture is illustrated and discussed below, with respect to FIG. 3.

It should be understood that the above description is merely intended to provide an example of a hierarchical layering of an architecture for the service mapper 120, and that greater or fewer layers of such a hierarchy may be used. By implementing such hierarchically-layered architectures, e.g., as described in more detail below, various features and advantages may be obtained. For example, as referenced above, the system 100 may easily be scaled up to include a large number of smart item devices, while still being able to perform mapping and/or re-mapping of services to and among the devices in a timely, efficient, and cost-effective manner.

In the example of FIG. 1, the GSM component 120a builds the hierarchy's root of the architecture and may serve as a first addressee of a service mapping request. For example, the GSM component 120a may serve as an interface to external modules (such as, for example, a service composition module, not shown in FIG. 1) that may be used to initiate the mapping process.

The GSM component 120a, generally speaking, provides information about its associated local networks (e.g., the local network 102), where each such local network may be associated with a physical and/or geographical location, such as a warehouse or a retail store. For example, the GSM component 120a may be used to sort the local networks according to their devices, provided services, and any further semantic information, including, as just referenced, location.

For instance, the GSM component 120a may include a GSM metadata table 136 that stores local network device descriptions that include information about existing devices and device capabilities in the given local network. For example, the GSM metadata table 136 may reflect the information that a given warehouse contains 100 sensors, distributed within the warehouse, and 20 PDA's that are used by the warehouse employees. In addition to the handling of such device information, the GSM metadata table 136 also may store and provide information about services that are provided in the respective local network. To continue the example just mentioned, the GSM metadata table 136 may store information that a service is installed in the warehouse that measures the warehouse temperature (e.g., using smart item devices, such as sensors). Such information about local networks with their devices, provided services, and further semantic aspects are thus available for use in performing the service mapping to one or more of the devices. A specific example of the GSM metadata table 136 is provided and discussed in more detail below with respect to FIG. 4A.

The GSM component 120a generally may not need to include descriptions or information about singular devices and their current usage state(s), and instead may simply maintain descriptions of abstract device classes and associated general attributes. Thus, the responsibility of organizing and tracking individual local networks may be left to the LSM component 120b. The LSM component 120b may be located closer to its associated network devices than is the GSM component 120a, so that multiple LSM components 120b provide a distribution of the data being collected and analyzed by all of the various network smart item devices. As with the GSM component 120a, the LSM component 120b may include a LSM metadata table 138 that stores the device information, along with service information associated with each device, quality of service information, and more specific location information for each device. A specific example of the LSM metadata table 138 is provided below with respect to FIG. 4B.

Although it is possible for the LSM component 120b to track and provide information regarding individual smart item devices, the example of FIG. 1 illustrates a case where the LSM component 120b divides its underlying network (e.g., the local network 102) into clusters or groups that include a set of possibly heterogeneous devices, typically in close physical proximity. For example, the device 108 and/or one or more of the devices 110, 112, and 114, and other devices, not shown, may be included in one or more groups associated with the local network 102 and the LSM component 120b.

In the example of FIG. 1, the device 108 serves as a group leader for such a group, and contains the GLSM component 120c. Such a grouping may allow improved control of parts of the landscape of the devices 108, 110, 112, and 114. For example, if a service needs to be evenly distributed in a defined area, then such group partitioning may be helpful. For example, a deployment request or order may require that a service should be installed on 10% of all devices of the local network 102, so that if the groups are dispersed evenly in the local area, the deployment may occur on a group-by-group basis, rather than with respect to all of the devices at once, so that some of the responsibility for distributing the service may be assigned to the various group leaders.

Another example of an advantage provided by the GLSM component 120c and the associated device grouping just described relates to an ease and efficiency with which the device metadata 130 is collected, e.g., by the system monitor 132 and/or the service mapper 120 (including the GSM component 120a, the LSM component 120b, or the GLSM component 120c). For example, at the time of a service deployment request, it may be necessary to determine a current state of certain devices throughout a number of local networks. Accordingly, device queries may be distributed by the GSM component 120a to the appropriate LSM components 120b, and then from the appropriate LSM components 120b to the appropriate GLSM components 120c. In this way, it is not necessary to query all the devices within the global system, or all devices within the various local networks, or even all the devices within a given local network. Rather, only devices that are actual or likely candidates for the particular service mapping may be required to provide their associated device metadata.

Analogously, monitoring of the queried devices, or of otherwise-specified devices, may occur at the group and/or local network layer(s), rather than at the global level. For example, the system monitor 132 may include a monitor component 132a that is installed on the device 108. In other examples, however, the monitor component 132a may additionally or alternatively be stored on the LSM component 120*b*. By monitoring devices in this way, the device metadata 130 may be collected in a timely, efficient, and scaleable manner, so that decisions regarding service mapping or re-mapping may likewise be made expeditiously.

Although the above description of FIG. 1 illustrates examples where the service metadata 126 and the device metadata 130 are used, perhaps with a performance metric, to perform mapping of services from the service repository 124 to one or more of the devices 108, 110, 112, or 114, it should be understood that other information may be useful in performing such a mapping. For example, network metadata 140 may include various network parameters, particularly where such parameters are dynamic and not necessarily discernable from information about any single device. One such example of the network metadata 140 may include available bandwidth on the local network 102. Other examples include a network topology description describing a distance of devices from the LSM component 120*b* (or other location information), mobility characteristics of the network as a whole, and reliability of network connections. Regarding the location example, for instance, a given service may be deployed to replace a currently-deployed service in a specific area within the local network 102. In this case, groups within the local network 102 may be associated with a group identifier (ID) as an additional network parameter, so that the deployment may proceed at least in part with respect to such group IDs. For example, the new service may need to be mapped within certain time constraints, so that, in this case, such services may be deployed, based on the group IDs and related information, on devices within groups that are closest to the LSM component 120*b*.

Further, such group IDs may be used in other settings, as well. For example, a group ID may be used in the service metadata 126 as a service requirement that the service in question be deployed on at least one of a specified number or type of group. Similarly, a group ID may be associated as a parameter of a particular device, within the device metadata 130 associated with that device. In this regard, it should be understood that the group ID may be considered either a static or dynamic (volatile) parameter of the device metadata 130, depending on whether and how often a device is assigned or re-assigned between groups.

Figure 2A:
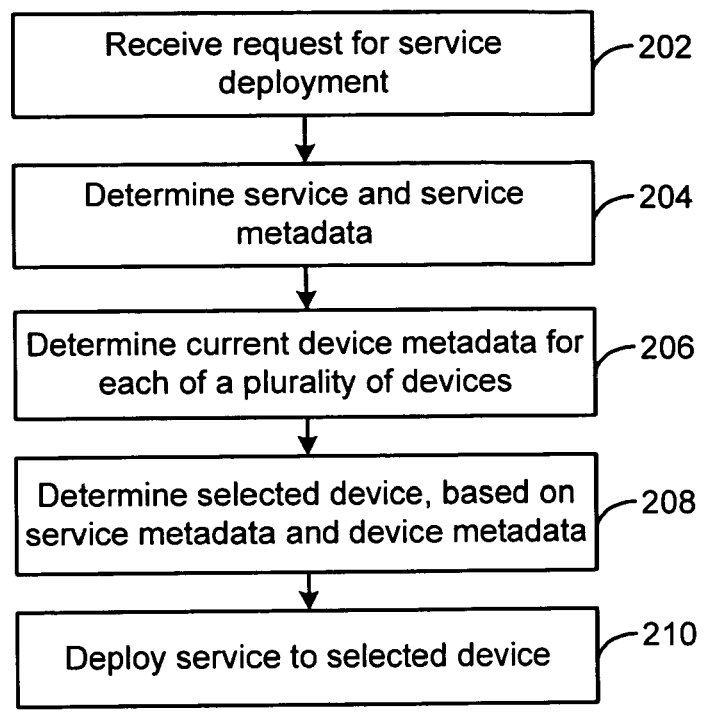
FIGS. 2A and 2B are flowcharts illustrating example operations of the system of FIG. 1.
Figure 2B:
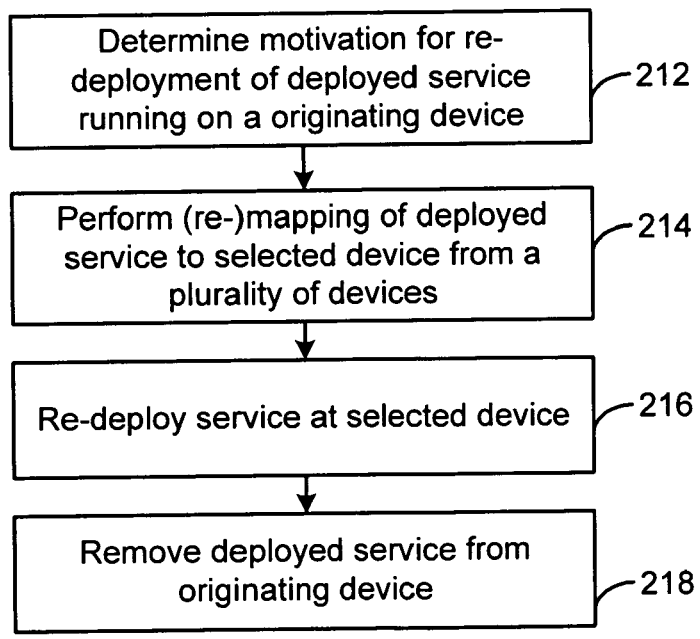

FIGS. 2A and 2B are flowcharts illustrating example operations of the system 100 of FIG. 1. Specifically, FIG. 2A is a flowchart illustrating an example mapping operation of the system 100. In the example of FIG. 2A, a request is received for a service deployment (202). For example, a user may enter a request to deploy a specified service, using a user interface such as the example user interface discussed below with respect to FIG. 10. In other examples, the request may be automated, e.g., may be received from an application of the business data processing systems 104 that requires a service to be deployed.

Based on the request, the specified service and associated service metadata may be determined (204). For example, the service mapper 120, or, more specifically, the GSM component 120*a*, may access the service repository 124 in response to the request to determine whether the requested service is available, and to determine the associated service metadata 126 and service executable 128. In some examples, the same service may be implemented for a plurality of development platforms, e.g., may be implemented for known development platforms that are based on the C programming language or the Java programming language. By providing such a diversity of development platforms, a given service may be deployable to a wider range or type of devices that may be in use. Information about the development platform(s) of the service in question may be included as a type of the service metadata 126, along with, for example, any of the various service requirements or preferences for operating the service that are provided and discussed above with respect to FIG. 1.

Current device metadata may then be obtained for a plurality of devices (206). For example, the service request may specify particular local networks, device groups, devices, or types of devices. In other examples, the service mapper 120 and/or the GSM component 120*a* may automatically select certain devices or types of devices, based on the service request and/or the associated service metadata. To collect the device metadata 130, the system monitor 132 may initiate one or more queries (perhaps sent from or in conjunction with the service mapper 120 or associated component thereof) that are distributed to the appropriate devices, and may then collect the device metadata 130 in response to the queries. For example, to distribute the queries and collect the device metadata 130 in return, information from the GSM metadata table 136 and/or the LSM metadata table 138 may be used, and groups of devices may be constructed and associated with group IDs, so as to collect the device metadata in a timely and scaleable manner. In other examples, the device metadata 130 may be collected by periodically requesting device information in anticipation of future service requests.

A selected device may be determined from the plurality of devices, based at least on the service metadata 126 and the device metadata 130 (208). For example, the service mapper 120 or one of its components 120*a*, 120*b*, 120*c* may apply a matching operation according to Eq. (1), in order to determine which of the queried devices allow even the possibility of deploying the service. For example, the matching operation may include a determination that an available platform-specific implementation (executable) of the service (e.g., a Java Virtual Machine for Java-based services) is executable on at least a given one of the device(s), or other device characteristics and capabilities may be matched against service requirements of the service to be deployed. Then, a performance metric such as illustrated in Eq. (2) may be used to determine a selected one of the matched devices as one that allows optimized performance of the service being deployed. Of course, as referenced above, other information may be used to perform the determination of the selected device, including the network metadata 140.

Finally in FIG. 2A, the service is deployed to the selected device (210). For example, a service injector, such as the service injector 134, may be used to deploy, install, and/or start the service on the selected device(s). In some implementations, the service injector 134 represents or includes a plurality of service injectors, where each service injector is associated with a specific development platform. In such cases, the availability of a service injector of a specific type may be included in the device metadata 130 and matched against a corresponding requirement of the service metadata 126.

Thus, FIG. 2A illustrates a high-level description of a service-to-device mapping process that may occur in the system 100 or related systems, for the purpose of deploying a service onto a selected device or a set of devices. As referenced above, it may be the case that a service has already been mapped and/or deployed to one or more devices, and that, for a number of possible reasons, it may be determined that the running service should be stopped, removed from the device on which it is currently running, and re-mapped and redeployed to a more preferable device. FIG. 2B is thus a flowchart illustrating an example of such a re-mapping process that may be performed by the system 100.

In the example of FIG. 2B, a motivation for re-deploying a deployed service running on an originating device is determined (212). For example, as referenced above, it may be the case that the service 122 is deployed and running on an originating device such as the device 108. Then, the system monitor 132 may be involved in determining a motivation for re-mapping the service 122, such as, for example, a detection of an availability of a more powerful or better-suited device, e.g., the device 110, on the local network 102. For example, such a device may be detected as becoming available as the result of a physical movement of the better-suited device 110 into a range of the local network 102, or as the result of a cessation of some other service on the device 110 (thereby freeing resources of the device 110 and making the device available for running the service 122). In another example, the motivation may include the detection of low power or limited memory at the originating device 108. In yet another example, the motivation may include a directive to the service mapper 120 to re-deploy the service 122 after some predetermined time period. As a result of one or more of these motivations, re-mapping may occur that helps ensure that the service 122 is running on a well-suited device on the local network 102.

Once a sufficient motivation has been determined, then re-mapping of the deployed service from the originating device to a device selected from a plurality of devices may occur (214). For example, the mapping process of FIG. 2A may be executed, so that, in such a case, the request for service deployment (202) of FIG. 2A corresponds to the determination of motivation to begin the re-mapping process, which may be expressed or determined, for example, by the system monitor 132. Further, although the process of FIG. 2B is referred to as "re-mapping," it should be understood that the service on the originating device 108 need not necessarily have been originally mapped by the mapping process of FIG. 2A. For example, it may be the case that the service 122 was originally installed directly and specifically on the device 108, without benefit of the mapping process of FIG. 2A. Thus, re-mapping in this sense refers to any removal and re-deployment of the service 122 or similar service from an originating device to a selected device.

Further, it should be understood that some techniques for performing the re-mapping may be dependent on, for example, the motivation for the re-mapping. For example, in a case where a specific device moves into the local network 102, the mapping may occur directly to that device that initiated the re-mapping in the first place, i.e., such a device will be automatically determined to be the selected or receiving device for the service 122. In other examples, such as where the motivation includes a detection of impending power loss of the originating device 108, then the full mapping process of FIG. 2A may be performed, e.g., a full querying of devices, matching of the resulting device metadata 130 with the service metadata 126, and determination and application of the appropriate performance metric, all may occur in order to determine the selected device as including one or more devices such as the device 110.

Once the re-mapping has been performed, the deployed service may be re-deployed at the selected device (216). For example, the deployed service 122 may be re-deployed from the device 108 to the device 110 or other selected device(s), using a service injector on the device 110. As discussed in more detail below with respect to FIG. 7, such a re-deployment may include a maintaining of a state of the service 122 on the originating device 108, just prior to the re-deployment. In this way, for example, a continuity of service may be maintained even during the re-mapping process.

Then, the deployed service may be removed from the originating device (218). For example, the service injector 134 on the device 108 may stop and remove the service 122 from the originating device 108. In this example, removal of the deployed service 122 from the originating device 108 is discussed as occurring after the re-deployment of the service 122 to the device 110. For example, this may occur in the case where the service 122 is providing some safety function or other service that requires continuity of service (e.g., sensors monitoring dangerous chemicals or condition), so that, especially together with the maintenance of state just referenced, there is little or no time where the dangerous condition(s) are not being monitored. In other examples, however, it should be understood that no state of the service 122 need to be maintained, and the service 122 may be removed from the originating device concurrently with, or before, re-deployment to the device 110.

Figure 3:
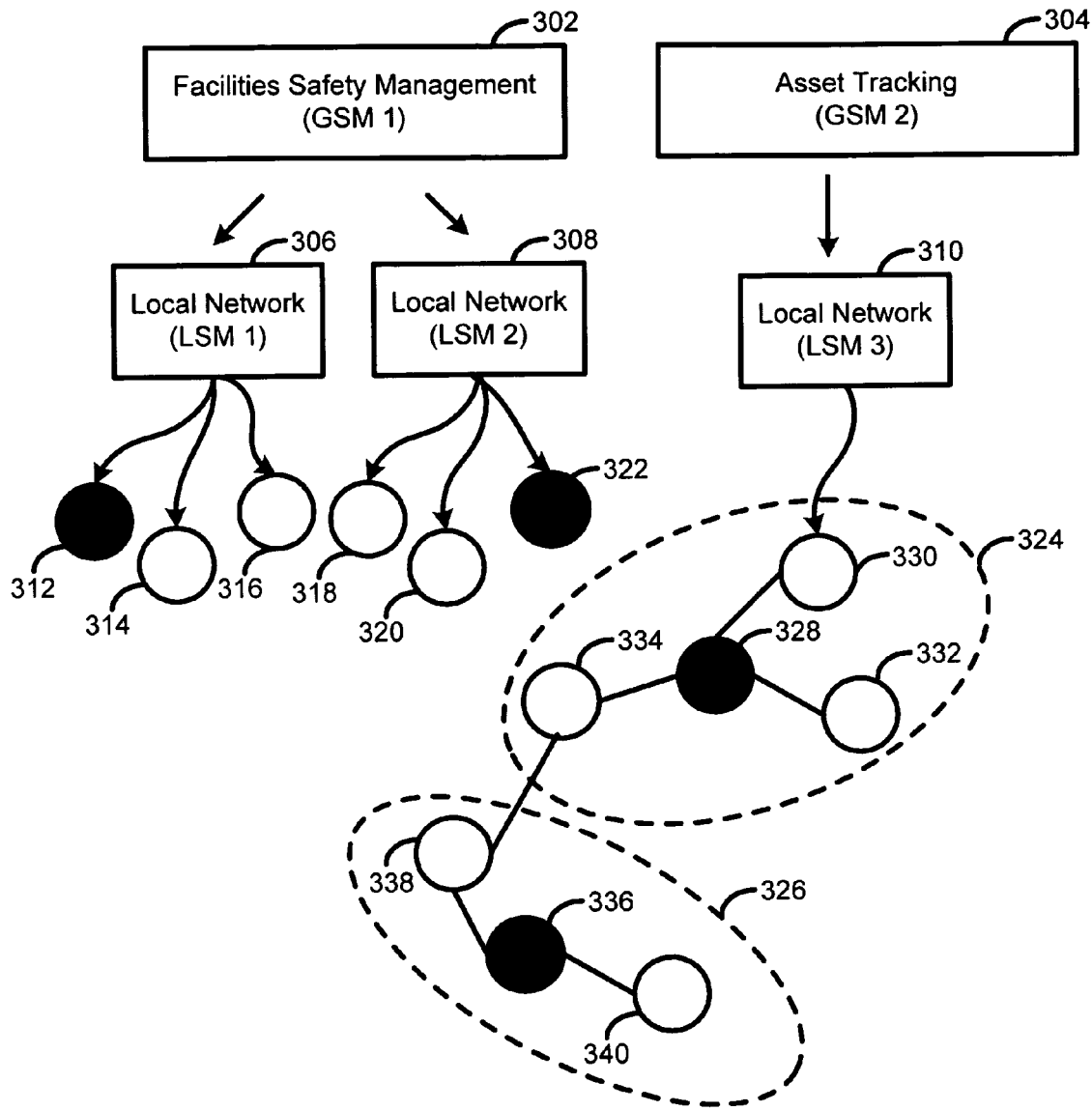
FIG. 3 is a block diagram illustrating a system using the three-tier architecture of the system of FIG. 1.

FIG. 3 is a block diagram illustrating a system 300 using the three-tier architecture of the system of FIG. 1. That is, the example of FIG. 3 illustrates a use of the global, local, and device (group) layers discussed above with respect to FIG. 1. For instance, FIG. 3 illustrates an ability of the system 100 to group different networks by provided service(s) and/or included devices. In this way, a wide range of services may be deployed on a wide range of smart item devices to achieve a variety of business goals, and, moreover, device networks may be structured into communities.

Specifically, in FIG. 3, a global layer includes a facilities safety management community 302 and an asset tracking community 304. As should be understood from the above description of FIG. 1, each of the facilities safety management community 302 and the asset tracking community 304 may be associated with an implementation of the Global Service Mapper (GSM) component 120a. Then, for example, the facilities safety management community 302 may include services and devices that are used to determine hazardous conditions (e.g., a presence of combustible or explosive materials or combinations of materials), while the asset tracking community 304 may include services and devices that may be used to track products all the way from their origin/manufacture until the products are placed on a shelf for sale. By segregating services and devices in this way, information from the enterprise may be assigned appropriately, and the various mapping and re-mapping procedures described herein may be performed efficiently, since, for example, no effort is wasted trying to map a vibration-detection service that is useful in the facilities safety management community 302 to a device in the asset tracking community 304, if it is known in advance that such a service is not useful in the latter context.

Then, local networks 306 and 308 may be considered to be part of the local layer referenced above with respect to FIG. 1, and may be associated with the facilities safety management community 302, while a local network 310 is at the local layer and associated with the asset tracking community 304. As already referenced with respect to FIG. 1, each of the local networks 306, 308, and 310 may be associated with a plurality of devices, and, specifically, the local network 306 may be associated with devices 312, 314, and 316, while the local network 308 may be associated with devices 318, 320, and 322. Then, the various devices may be grouped to form the group layer of FIG. 1, where one of the devices is selected or determined to be a group leader for a given group. In FIG. 3, the device 312 is a group leader for the group including the devices 312, 314, and 316, while the device 322 is the group leader for the devices 318, 320, and 322.

Meanwhile, the local network 310 of the asset tracking community 304 is associated with a group 324 and a group 326, where the group 324 includes devices 328 (as group leader for the group 324), 330, 332, and 334, and where the group 326 includes devices 336 (group leader for the group 326), 338, and 340. As should be understood from the above description of FIG. 1, the local networks 306, 308, 310 may include implementations of the local service mapper (LSM) component 120b. Such an LSM component may include a computing device or server (e.g., laptop computer or Stargate server) that possesses sufficient computing resources and that is physically close to its corresponding devices, compared to their corresponding GSM components. Thus, in FIG. 3, the groups 324 and 326 illustrate the fact that in some implementations, only certain devices (e.g., the device 330), and not necessarily the group leader device, may have direct access to the device or server running the LSM component 120b. As a result, in such cases, communications between the LSM component and other devices of the groups 324 and 326 may occur via the directly-connected device 330.

FIGS. 4A and 4B are tables illustrating examples of the GSM metadata table 136 and the LSM metadata table 138, respectively. In FIG. 4A, the GSM metadata table 136 includes a column 402 that identifies an associated local network (e.g., identifies an implementation of the LSM 120b). For example, in FIG. 3, the column 402 may identify that the local network 306 and/or the local network 308 is associated with an implementation of the GSM component 120a that is associated with the facilities safety management community 302, where this community is identified in a column 404.

Then, a column 406 may be used to refer to corresponding device metadata files (e.g., XML files according to a defined XML schema) that describe, for example, a sensor associated with the LSM component 120b that is operable to provide certain capabilities. Analogously, a column 408 may be used to refer to corresponding service metadata files, which describe a general nature of the service(s) in question, including, for example, information regarding a temperature and vibration service that is being implemented by the sensor of the column 406. A column 410 provides a location of the local network, e.g., with respect to a "warehouse A," as shown. The device metadata 130 and the service metadata 126 may thus be referenced in the GSM metadata table 136 in a general, high-level way, without requiring the GSM metadata table 136 to maintain a current state of all devices of all (or some) local networks. Of course, other information may be included in the GSM metadata table 136, such as, for example, whether the device is mobile or fixed.

The data files of the GSM metadata table 136 may be stored on one or more servers, and may be loaded by a user on demand. In other implementations, data files of the GSM metadata table 136 may be loaded automatically by the GSM component 120a, or by an administrator (more generally, it should be understood that virtually any action described herein as being performed by a user may be implemented automatically using an appropriate computing resource(s)). As a result, a service mapping request may be routed to an appropriate GSM component at the global layer, and the corresponding GSM metadata table 136 may be used to determine, e.g., which relevant device/services properties or types may be considered for the service mapping request. By using the GSM metadata table 136 and other such tables, a need to consecutively traverse all available local networks and devices may be reduced or eliminated.

FIG. 4B illustrates an example of the LSM metadata table 138, and includes a column 412 that identifies a group of devices using an associated group identifier, where a column 414 identifies the members of the group identified in the column 412. For example, the column 414 may specify that the group of the column 412 includes a PDA and a sensor node, with associated (types of) capabilities.

A column 416 specifies (types of) services that may run on the group members (devices) of the column 414. In FIG. 4B, the column 416 identifies a display service and a temperature service. Thus, a group may be considered not only as a collection of devices, but also as a collection of services that are offered by the group. In such cases, services may be identified even over a large area and for a number of different types of devices.

A column 418 specifies quality-of-service (QoS) issues, such as, for example, a current resource usage of the group identified in the group ID column 412. By specifying an available QoS of a group, a reliability and performance of the group may be known and evaluated. Finally in FIG. 4B, a column 420 specifies a location of the identified group within the relevant local network, e.g., within "area 1" of a "warehouse A" of the local network, as shown. Thus, the location of the group may be, for example, in close proximity to the LSM component 120b for that group, so that, for example, communications between the LSM component 120b and the group may be timely and reliable.

From FIGS. 3, 4A, and 4B and the above discussion, it should be clear that the LSM component 120b may be responsible for organizing its own local networks, and, in contrast to the GSM component 120a and its storage of higher-level descriptions and classifications of types of devices and/or services, may be responsible for storing information that is specific to actual, individual devices and/or services. As described, the LSM component(s) 120b may be physically located closer to their respective devices and networks (e.g., may be located in a same warehouse or other building or site as the devices), and may be used to bridge a space between the GSM component(s) 120a and the individual devices. By splitting responsibilities in this manner, a favorable distribution of large amounts of data may be obtained.

Thus, the LSM component 120b may contain a standard interface to its corresponding GSM component 120a, from which it may receive mapping requests for mapping a service to one or more of the devices of the LSM component 120b. The LSM component 120b, as described in more detail below, may include a gateway server Beyond the examples of FIGS. 4A and 4B, it should be understood that other parameters and metadata may be included in the GSM metadata table 136 and/or the LSM metadata table 138. For example, additional properties of the group(s) may be included, such as a scale of each group, e.g., in terms of a maximal number of hops between the group leader and a group member, or in terms of a group size that defines a maximum number of group members that may be included.

A third layer of the three-tier architecture(s) of FIGS. 1 and 3 is the group leader layer, at which the GLSM component 120c may be deployed. A group leader thus generally represents a dedicated device of a local network that serves as a representative of a corresponding group into which the local network is clustered (as shown in FIGS. 1 and 3). As shown in FIG. 4B, such group leaders are registered at the LSM component 120b (e.g., stored in the LSM metadata table 138) and provide an abstraction from a corresponding, underlying device cluster. Group leaders may thus be used to provide information about respective group members, as well as about the services provided by the group members.

The semantic information on each layer of the three-tier architecture may be regarded as building blocks of a lightweight semantic overlay that is put on an underlying mobile ad-hoc network. Such a semantic overlay enables the grouping of semantically-related services or devices together, independent of physical locations of the services/devices. For example, at the global (GSM component 120a) layer, physically-distributed local networks may be identified that are connected by the same or similar role(s) within the enterprise. Similarly, groups on the local (LSM component 120b) level may be identified with respect to information about the constituent devices and functionalities of these groups.

Figure 5:
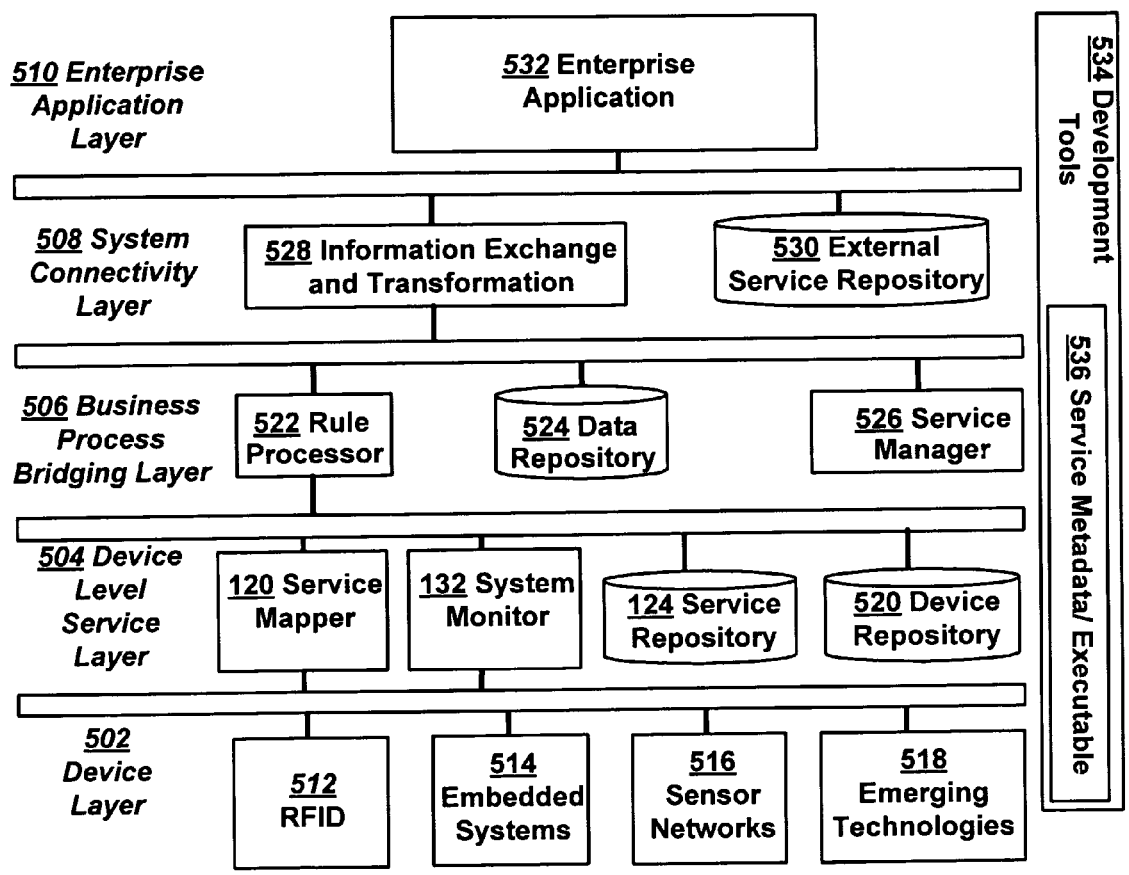
FIG. 5 is a block diagram of a smart items infrastructure for implementing the systems of FIGS. 1 and 3.

FIG. 5 is a block diagram of a smart items infrastructure 500 for implementing the systems of FIGS. 1 and 3, respectively. The smart items infrastructure 500 includes five layers: a device layer 502, a device level service layer 504, a business process bridging layer 506, a system connectivity layer 508, and an enterprise application layer 510. The layer 502 may be considered to contain various ones of the devices 108, 110, 112, and 114 of FIG. 1, or similar devices, across a number of groups, local networks and/or physical locations. Meanwhile, the layers 506, 508, and 510 may be considered to be part of, or associated with, the business data processing systems 104 of FIG. 1. Thus, the layer 504 may be considered to represent remaining components of the system 100 of FIG. 1, e.g., the service mapper 120 and its components 120a, 120b, and 120c, the system monitor 132 and its component 132a, and the service repository 124, as shown in FIG. 5.

The device layer 502 thus comprises the actual smart item devices, as well as any communications between them. The device layer 502 also is responsible for presentation of any offered hardware services to the next higher layer, the device level service layer 504. The devices may include, for example, an RFID device 512, embedded systems 514, sensor networks 516, and any other new or emerging technologies 518, as would be appropriate.

For example, for the RFID device(s) 512, mobile tags may be attached to real-world objects, and are then read (and optionally written to) by RFID readers. In an implementation using active tags, the active tags may also provide additional sensor data (e.g., a current value or a past value). In RFID, communication is typically initiated by the reader, while tags may or may not directly communicate with each other. Such an RFID reader may be configurable to the extent of processing tag data, e.g., may be configured to perform verification of written data, or to avoid reporting a disappearance of a tag if the ostensibly lost tag in fact reappears within a given time window.

Techniques for communicating with the embedded systems 514 may vary on the types of devices of the embedded systems. For example, the embedded systems may represent anything from small-scale, one-chip microcomputers, all the way to full-blown PC hardware. Thus, for example, for devices that have the capabilities of a mobile phone or more (e.g., are able to run a Java Virtual Machine™), implementation may be performed in Java™ or based on OSGi (the latter representing a known framework for implementing a component model for remote installation and management of applications and/or application components). As also described above, the sensor networks 516 may include any number of types of sensors that may include integrated processing power and that may be able to execute peer-to-peer communication.

The device level service layer 504 manages the deployable services used by the device layer 502. Thus, the layer 504 includes the service mapper 120 (and service mapper components 120a, 120b, and 120c), the system monitor 132 (and the system monitor component 132), and the service repository 124.

As referenced above, the service repository 124 may store at least two kinds of services, compound and atomic services. The compound services generally rely on other services to fulfill their tasks, and may have no directly-executable code of their own; rather, the compound services may include an executable service composition description that is stored in a corresponding service description. Thus, compound services may have one service executable, i.e., the service composition description. In contrast, atomic services do not generally use other services, and have their own directly-executable code. Also, as mentioned above, since an atomic service may be deployable on different platforms, an atomic service may have more than one service executable, e.g., may have a service executable for each of the different platforms.

The service repository 124 also may store the service metadata 126, where such service metadata 126 is described in detail, above, and may include a service name, identifier, version, or vendor, or may describe run-time requirements of the service, including, for example, technical deployment requirements (e.g., high bandwidth, or minimum processing power required), semantic requirements (e.g., that a receiving device have a serial connection and/or many device neighbors), and spatial requirements (e.g., that a receiving device be in the basement, or at a south side of a specified building).

Finally at the device-level service layer 504, a device repository 520 may be included. As should be understood from the above description, the device repository 520 may include, for example, information about devices (e.g., the device metadata) in an manner analogous to that in which the service repository 124 maintains information about services (e.g., the service metadata). For example, device metadata may be stored in the device repository 520 after the results of a device querying operation have been determined, or, in another implementation, may be stored by an administrator based on externally-available information about the devices. For example, as already mentioned, the device metadata may include a device name, power capacity, memory capacity, processing capacity, or other information that may be relevant to mapping (and ultimately deploying) a service to an associated device.

At run-time, the system monitor 124 monitors a current system state. Whether and how any part of a state of a service is exposed to the system monitor may be set by a developer of the service at design-time. This state-availability information is thereafter available both to a system administrator and to the service mapper 120. As also described above, the service mapper 120 receives deployment requests and then determines on which device(s) the corresponding service should be deployed, e.g., by matching the service metadata to the device metadata, which may include a current state of the smart item devices and related local network(s). As also described herein, the service mapper 120 also may react to certain events or conditions, including changes in the network state (as recognized by the system monitor 124), and may thereafter decide to re-map a service or add or remove instances of services to better fulfill given deployment requests/requirements.

The business process bridging layer 506 includes services designed to aggregate data from the devices at the device layer 502, provided via the device level service layer 504, and to transform the data from the device layer 502 into business-relevant information. In so doing, an amount of data sent to back-end enterprise application systems may be reduced, and business logic may be executed for different ones of the enterprise application systems.

For example, one or more rule processor 522 may be used to parse incoming messages, support basic operational services (e.g., item movement, association, de-association, or device reading/writing) and support information querying. The rule processor 522 processes user-defined business rules that define or reference any other basic operational services that should be executed or consulted. Using such rules and basic operational services provides a flexible framework to adapt the system 500 to different business scenarios.

The rule processor 522 may use a data repository 524 for keeping track of all physical objects of interest, e.g., for keeping track of the current state, location, timestamp, or associated business transaction of a given object being tracked, as well as for keeping track of what future actions are expected. Aggregated information from the data repository 524 may be reported on a regular basis, e.g., daily or monthly.

One example of an operation of the layers 502, 504, and 506 includes a "goods receiving" scenario. For example, a provider delivering objects to a receiver may send an Advanced Shipment Notification (ASN) containing a list of all objects in the shipment, along with object identifiers such as Electronic Product Codes (EPCs). The ASN may be stored in the data repository 524. When the shipment arrives and passes the RFID readers at the device layer 502, e.g., at a receiving dock door, then the EPCs are read by the RFID readers, and sent to the rule processor 522. The rule processor looks up the ID of the reader from which the message came, determines a location and role of the reader, and then calls the appropriate basic operational service responsible for handling received shipments. This operational service compares the obtained EPCs with the expected EPCs from previous ASNs, and, if a match is found, reports to an enterprise application 532 that the delivery has arrived and is complete. The executed operational service also may then update the data in the data repository 524. Services described above, as well as services for receiving and sending the involved messages, may be managed by a service manager 526.

Components in the system connectivity layer 508 may be used to connect different application systems and to support system and data integration. For example, messages and data may be routed to the correct backend systems by an information exchange and transformation module 528, and also may be transformed thereby to enable a semantically-correct integration. On top of message-routing and transformation services, the system connectivity layer 508 also may be used to transport the service executable(s) 128, using an external service repository 530, when a given service is deployed from a development environment to the service repository 124 of the device level service layer 504.

The enterprise application layer 532 includes, for example, traditional enterprise IT systems responsible for controlling and managing enterprise business applications. An enterprise application covering a specific business process may not be a single program, but rather may be composed of different services that work together to achieve a desired functionality. Such services may be provided by the same enterprise system, by another enterprise system within the enterprise application layer 532 (possibly located at a site of a business partner), or by systems from lower layers (e.g., by smart item devices at the device layer 502).

Finally in FIG. 5, development tools 534 may refer to tools for creating enterprise application(s) 532 and other applications/services. Using a development environment integrated with the infrastructure 500 may support the implementation of basic services in manners that are similar to known development tools in the enterprise application space. Further, the development tools 534 may allow the creation of the required service metadata 126, as well as the inclusion of existing services into new applications. Furthermore, the development tools 534 allow a developer to specify where a certain service should run, to configure individual service instances, and to deploy the services in a desired manner. That is, a developer may develop service metadata/executable(s) 536 using the development tools 534, and may then provide desired ones of the service metadata/executable(s) 536 for storage in the service repository 124, and/or for mapping/re-mapping by the service mapper 120 at the same or later time.

Figure 6:
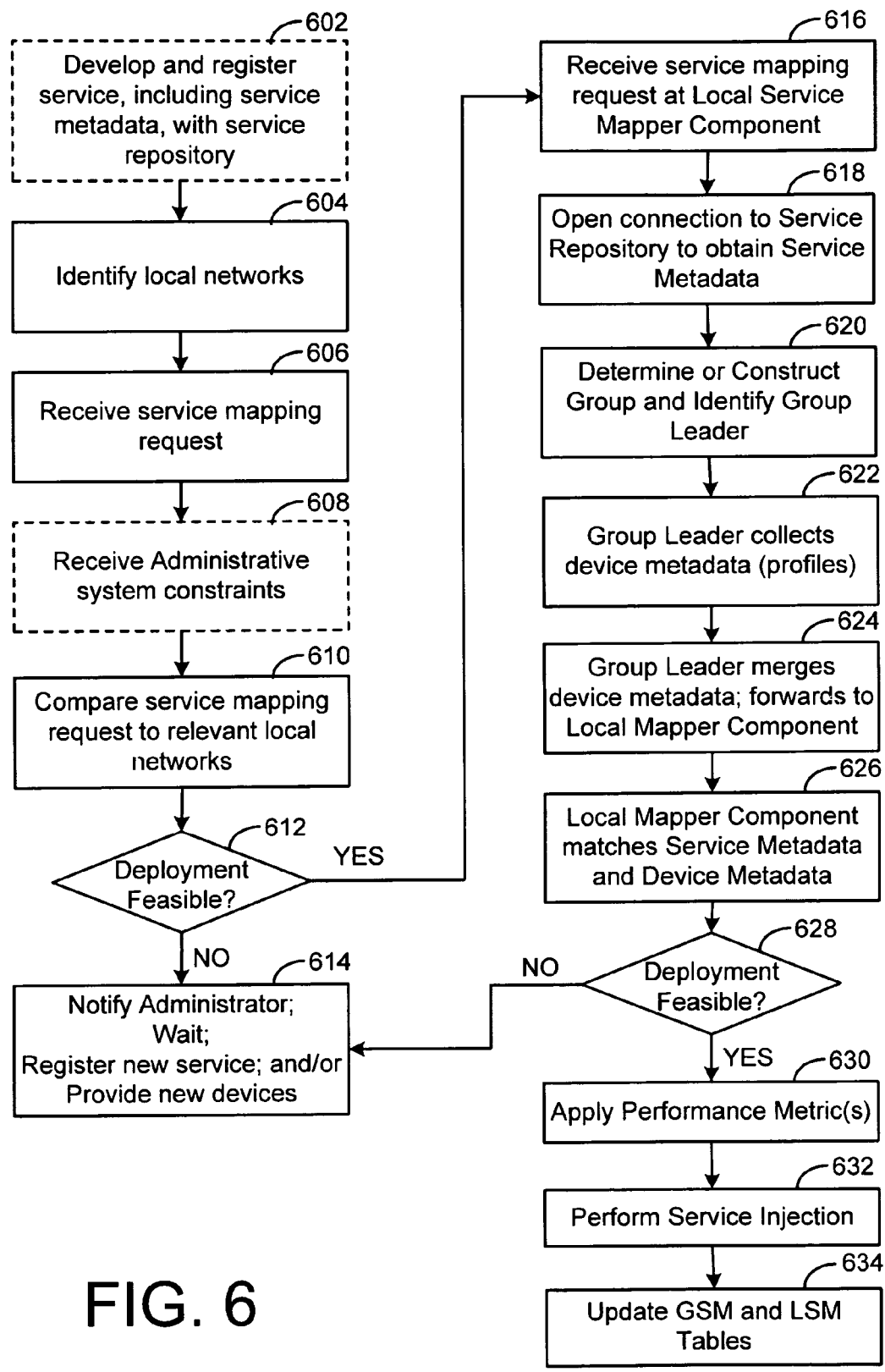
FIG. 6 is a flowchart illustrating a service-to-device mapping operation.

FIG. 6 is a flowchart 600 illustrating a service-to-device mapping operation. In the example of FIG. 6, a service (including and/or associated with service metadata and one or more service executables) is initially developed and registered with the service repository 124 (602). For example, the development tools 534 of FIG. 5 may be used to design and construct a service executable and associated service metadata, for implementation on a particular platform type.

Local networks may then be identified (604), at a global level of the three-tier architecture described herein. For example, the GSM metadata table 136 of FIGS. 1 and 4A may be determined, in which local network (e.g., LSM) information, including community information, device or service information, and locations, and possibly additional or alternative information, may be stored. As described with respect to FIG. 4A, such global-level information may be determined and represented at a high or abstract level, e.g., without reference to any particular or singular device, but rather with respect to the types of devices, functions, or services that are known to be associated with a given local network(s). As described below, the GSM metadata table 136 thus serves as a starting point for determining whether and how to proceed with a service-to-device mapping.

Accordingly, a service mapping request may be received (606) at the service mapper 120, e.g., at the GSM component 120a. For example, an administrator or other user, or another system component, may access the GSM metadata table 136 with the intent of mapping a desired service to an appropriate local network and device, and may thus issue the service mapping request to the GSM component 120a by identifying the desired service or type of service. Such a request may take various forms. For example, the administrator or other system component may request mapping of a specific service to one or more explicitly identified devices, or may request deployment of a service on all (available) devices. The administrator or other system component also may request mapping and deployment of a service to some specified number or percentage of devices. Finally, and as described hereafter in the example of FIG. 6, the administrator may specify that the service should be specified on the "best" device or devices for a given context, e.g., according to a performance metric as described above with respect to FIGS. 1 and 2A.

In the case where target devices are given in the service mapping request, the GSM metadata table 136 may be used to detect all local networks with the specified devices. For instance, if a service needs to be deployed on all PDAs of all local networks, then all local networks which contain PDAs will be retrieved. Thus, a search for the local networks may be supported by abstract device classes maintained in the GSM metadata table 136 as additional information about the local networks.

In other examples, descriptions of services may be helpful in determining the local networks. For example, using the service metadata 126, communities with similar services already running may be found and analyzed to detect relevant (types of) devices that are being used. For example, if a new service that is part of facility safety management needs to be deployed, and since local networks are associated with communities, the corresponding facility safety management community 302 may be used to detect potentially relevant local networks/devices.

As further input to the GSM component 120a, the administrator or other system component may specify certain administrative constraints (608). For example, the administrator or other system component may specify a required deployment density for the service (as described above with respect to FIG. 1), or may specify use of a certain type of device, or may specify a time constraint for accomplishing the mapping and/or deployment. As also described with respect to FIG. 1, such abstract administrative constraints may be translated into concrete constraints with respect to a specific network of devices to which the service will be mapped (e.g., a device density of 10% may be translated into a concrete number of devices in an area associated with a specific local network).

The service mapping request may then be compared to the relevant local network information (610). For example, even at the global layer or level of the GSM metadata table 136, comparisons of the service mapping request with the local network information may significantly narrow the possible outcomes of the service mapping request. For instance, with regard to FIG. 3, if the service mapping request is associated with the asset tracking community 304, then the local networks 306, 308 that are associated with the facilities safety management community 302 may be removed from consideration for the service mapping request. Similarly, device or service or location information of columns 406, 408, or 410, respectively, may reduce a number of local networks to consider for possible service deployment.

Thus, a determination may be made as to whether deployment of the service is feasible (612). If deployment is not feasible, such as where no devices, services, or locations may be matched with either the service mapping request and/or the administrative constraints, if any, then several actions may be taken (614). For example, the administrator may be notified, or a wait mode may be entered (e.g., in anticipation of the possibility that some device or network condition will change and deployment will then be feasible). Further, a new service may be provided; e.g., a service may be newly-designed, modified, and (re-)registered with the service repository 124, such that the newly registered services may be more compatible with prevailing local network conditions.

If, however, no obstacles to deployment of the specified service are identified, then the service mapping request may be passed to, and received at, the LSM component 120b (616). The LSM component 120b may then open a connection to the service repository 124 to obtain specific service metadata associated with the requested (type of) service (618). For example, the LSM component 120b may obtain an XML document having a pre-determined XML schema and specifying the service metadata, e.g., service requirements, from the service repository 124.

Then, a group and associated group leader thereof may be determined or constructed (620), in association with a group ID that is unique to the group. As described, a group may be described either by its constituent devices and/or its provided functionality.

Group generation within a local network may take place by way of a number of mechanisms. For example, a group may be determined or designated based on a number of parameters/requirements, such as, for example, a maximum number of hops between group member(s) and a (potential) group leader, or a maximum number of members of the group.

During group creation, a discovery mechanism may be used that allows device discovery while minimizing network traffic, since network traffic and other send/receive actions of devices are at a premium for smart item devices, which tend to have a relatively small amount of computing and power resources. As part of such processes, message sent out on a local network and intended to build a group may contain both functional and non-functional group attributes, along with the unique group-ID. Then, messages in response from potential group members may be evaluated to create the group. Some devices may be excluded from the arising group due, e.g., to restrictions regarding group size or other attributes. Such rejected devices may start another group creation process in the same or similar way, so that the local network is ultimately divided into groups or clusters (e.g., as shown in FIG. 3).

Then, a group leader of each group or cluster may be selected, based on one or more of the following criteria, or on other criteria. For example, in deciding between multiple group members to determine a group leader, factors may be considered that include a resource richness of the potential group leaders relative to one another, since, for example, the group leader may be in communication with the LSM component 120b and other group members, and may thus require sufficient resources (e.g., battery, CPU, memory, or bandwidth) to enable this communication. As another example, a larger number of devices to which the potential group leader is connected may allow the potential group leader to act more efficiently in aggregating information from, or propagating information to, its associated group members. As another example, frequent or recent uses of a potential group leader may disqualify that device from acting as group leader again until some condition has been met.

Once a group leader has been determined, appropriate routing protocols may be selected to ensure that the potential group member devices may communicate with one another in a feasible and efficient manner. For example, even if a group includes heterogeneous devices such as, for example, laptops, PDAs, or smart phones, communication therebetween should be enabled. Examples of routing protocols include position-based routing (based on physical locations of devices), and/or topology-based routing protocol(s) that relies on a direct proximity of devices.

Once the group leader(s) is/are determined, the LSM component 120b may send a message to the group leader(s) in order to instruct the group leader(s) to collect device metadata, e.g., device profiles, of its (their) associated group(s) (622). Collection of device metadata may be performed using various query techniques that are able to collect the device metadata without overwhelming a power and/or communications capacity of the associated local network and devices. Moreover, such query techniques may take into account a potential mobility and unreliability of the local network infrastructure, since, e.g., new devices may join or leave the local network during the query process.

Types of query to be performed may vary. For example, hoarding queries may be used that focus on completeness of results. For example, such hoarding queries may execute unique queries (referring to devices that are rare and therefore easily identifiable on the local network), or representative queries (e.g., referring to queries in which service deployment is to occur on all devices of an area, such as all devices in a particular building).

In contrast to these hoarding queries, selective queries may include different strategies to provide a scalable and adaptive cluster-based device discovery. Such a device discovery may include (1) an identification of proper clusters that contain required devices, (2) assignment of priority (in which a priority assesses a ranking regarding the query forwarding to the group leader, and indicates from which group more relevant results are expected).

Regarding the identification of proper clusters that contain required devices, it should be understood that an absolute number of group members may not be as relevant as a relative number of group members which belong to a specific device class. Regarding assignment of priority, a distance from the group to the gateway server running the LSM component 120b may be taken into account. In other words, for example, groups closer to the LSM component 120b may require fewer hops to transmit data packets to the LSM component 120b. Furthermore, groups having relatively greater current resource capabilities may be preferable.

For representative queries, which generally target all kinds of devices in the network, a different strategy may be used. For example, the following priorities may be pursued consecutively: groups with the most (non-specific) devices, parallelism of querying and/or retrieval of data, group leader with high available bandwidth, groups with the strongest resource capabilities, and groups close to the LSM component 120b in terms of hops.

In such representative query techniques, the absolute number of devices which a group contains may be relevant. In these cases, since a representative overview is required, no distinction between specific device types may be required. Parallelism and high availability of bandwidth may be used to enable a fast transfer of a potentially large amount of device profiles, and may be used to organize efficiently the distribution of queries in a mobile and potentially unreliable network.

Similar techniques and considerations may be possible for selective queries that target more the performance than the completeness of expected results. For example, strategies regarding "top N" (e.g., ten best nodes on the local networks) and "first N" (e.g., the first devices encountered on the local network and located within a certain distance of the LSM component 120b) rely on an appropriate pre-selection of identified device profiles.

In general, both these examples of selective queries ("top N" and "first N") may follow a procedure in which group leaders request device profiles from all their group members, and then the group leaders pre-select received results (i.e., either the best 'N' device profiles or the first 'N' device profiles). Finally, the group leaders forward the result set to the LSM component 120b, which may then select the best 'N' results overall.

It should be understood that in some implementations, a current device landscape will not be permanently monitored. Instead, the necessary information about a current state of the local networks and their devices may be drawn at a time of a service mapping request.

Once each group leader has queried its respective group devices using one or more of the query techniques just described, or using other techniques, the group leader may merge the collected device metadata (e.g., device profiles) for forwarding to the associated LSM component (624). For example, the group leader may create an XML file containing all of the device metadata for its associated devices.

In this way, the LSM component has the information necessary to match the known service metadata with the received device metadata (626). For example, the LSM component 120b may have gained the service metadata 126 from the service repository 124, and, having received the device metadata 130 for a plurality of devices as just described, may match, e.g., service requirements of the service metadata 126 against device profiles of the device metadata 130. For example, if the service requirements and device profiles are provided in respective XML documents according to a predetermined XML schema, then parameters and values for, e.g., memory, power, and processing power may be matched against one another to determine some sub-set of devices of at least one group that is capable of handling deployment for the service in question.

If an attempt at such a matching operation results in a determination that no deployment is feasible (628), then one or more of the various options mentioned above (614) may be invoked, including notification of the administrator, entering a wait mode, registering a new service that is deployable on at least one device, and/or providing new devices or device capabilities.

However, if deployment is feasible (628), and at least a minimum number of matching devices are determined for deployment, then a performance metric may be applied to determine which of the matched devices is/are best-suited to implement the functionality of the service in question. For instance, as in the example above, the service metadata 126 may include information regarding a relative weight or importance of certain ones of the service requirements relative to other ones of the service requirements. Then, these relative weights may be incorporated into the performance metric for comparison against the device metadata, so that the matched devices may be ranked and/or filtered according to which devices are best-suited to perform the service functionality. Then, such best-suited devices may be identified and selected by the LSM component 120b for deployment thereon of the service in question.

Thus, injection of the service at the selected device(s) may be implemented (632). For example, as described with respect to FIG. 1, the service injector 134 may be used to install and start the service on the selected device. As also mentioned above, the service injector 134 may be selected based on a compatibility with a development platform with the service executable of the service.

Once the above-described service-to-device mapping has occurred, the GSM and LSM tables may be updated (634). For example, information obtained by the LSM component 120b and/or the group leader(s) may be reflected in the GSM metadata table 136 and/or the LSM metadata table 138. For instance, the quality-of-service column 418 of the LSM metadata table 138 may be updated to reflect the new resource usage of each different group. As another example, the group ID column 412 of the LSM metadata table 138 may be updated to reflect the new and/or different groups that exist after the device discovery procedures described above.

Figure 7:
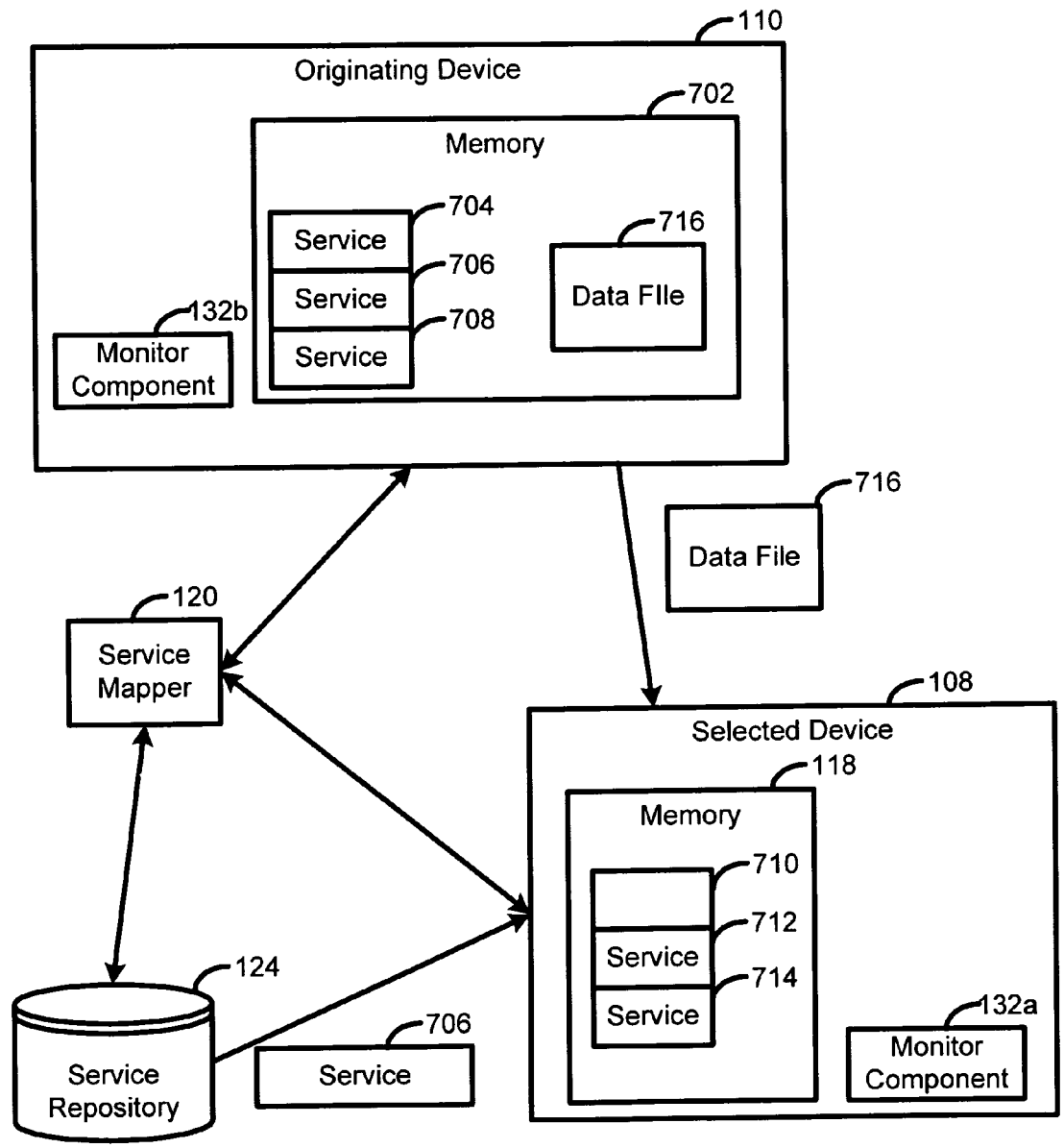
FIG. 7 is a block diagram of a re-mapping implementation of the system of FIG. 1.

FIG. 7 is a block diagram of a re-mapping implementation of the system 100 of FIG. 1. That is, as already described with respect to FIG. 2B, the system 100 may be involved in a re-mapping procedure that allows improved device exploitation by relocating services from resource-poor devices to more powerful devices.

In FIG. 7, devices 110 and 108 are illustrated as the originating device and the selected device, respectively, of the re-mapping procedure of FIG. 2B. Various elements of devices 108 and 110 are not shown in FIG. 7 for clarity and brevity, including, e.g., the various elements discussed with respect to the device 108 in the context of FIG. 1.

The originating device 110 includes a memory 702 that stores a service 704, a service 706, and a service 708. Similarly, the selected device 108 includes the memory 118, which includes available storage 710 along with a service 712 and a service 714.

The system monitor 132 may include, as shown in the example of FIG. 7, system monitor components 132a and 132b, which are operable to detect information about a current resource availability and/or usage of their respective devices for reporting to the service mapper 120. Of course, in other example implementations, the system monitor 132 may be implemented remotely from the devices 108, 110, and the service mapper 120 may be implemented to include the GSM component 120a, the LSM component 120b, and the GLSM component 120c.

Thus, in FIG. 7, the monitor components 132a and 132b may detect and provide resource usage and/or availability information regarding the devices 108 and 110, respectively. Based on this monitored information, the service mapper 120 may determine that a motivation exists for re-mapping the service 706. Examples of motivations are provided above, and include a determination of relatively or dangerously low resource levels of the originating device 110, or an entry of a more powerful or resource-rich device within a range of the local network.

As described in more detail below, FIG. 7 provides an example in which the service 706 is to be re-mapped from the originating device 110 to the selected device 108. In general, before or during such a re-mapping procedure, a mobility degree of the service 706 (or other service) may be checked by the service mapper 120, using the associated service metadata of the service 706. For example, the service metadata may contain information about a location of the originating device 110 (which may limit mobility of the service 706, e.g., if the originating device 110 is in a location with poor connectivity). As another example, the service metadata may contain information about any dependencies that may exist between the service 706 and the originating device 110 that may prevent the service 706 from being re-mapped.

More generally, the mobility degree of the service 706 may be expressed as "fixed," in which re-mapping is not permitted; "movable," in which case the service (and possibly a status of the service) may be moved from device to another; and "partly movable," in which case the service 706 may include different interacting parts, and some of the parts, but not all, are allowed by to be re-mapped.

It should be apparent that re-mapping of the service 706 from the originating device 110 to the selected device 108 may, in some implementations, share many features of the mapping process described above, e.g., with respect to FIG. 6. Accordingly, re-mapping features that are additional to, or modified from, the mapping process of FIG. 6 are described in more detail, below.

For example, as discussed with respect to FIG. 2B, it may be necessary or advantageous to save a current state of the running service 706 with respect to the originating device 110, and, in FIG. 7, a data file 716 stored in the memory 702 may be used for this purpose. In this context, the terms state or service state may include, for example, all relevant data that may be associated with the service 706, and/or that may allow a continuity of execution of the service 706 before, during, and after the re-mapping process.

Determination of which data should be moved/included with the service 706 may depend, for example, on the type of service. For example, for an aggregation service like "average temperature," it may be reasonable to save and to transfer the last calculated temperature value to the selected device 108. In other implementations, however, it also may be reasonable to transfer the whole temperature history of the average temperature service. Information regarding which service/data may be moved may be included in the corresponding service metadata.

The data file 716 may generally be used to save relevant data that is to be moved to the selected device 108. The data file 716 also may be continuously filled with data during execution of the service 706 on the device 110, thereby to enable a possible reconstruction of the history or other service data. In either case, it should be understood that any kind of relevant data may be stored in the data file 716 at the time of service re-mapping.

Further, the re-mapping procedure, as executed by the service mapper 120, may be in charge of checking service and/or device data for consistency, and saving them in the data file 716. In this case, a buffer may be used to facilitate service data storage and transfer. It is also possible to permit different procedures for different services, e.g., to define in the service metadata of a service that the state of the service may be part of a possible relocation.

In some implementations, the service 706 (e.g., service executable) may be moved directly from the originating device 110 to the selected device 108. In other implementations, the service 706 may be identified by the service mapper 120 within the memory 702 of the originating device 110, but may then be accessed from the service repository 124 for injection onto the memory 118 of the selected device 108.

In some instances, re-mapping may occur between different device types. For example, the originating device 110 may include a PDA, while the selected device 108 may include a laptop computer. Such flexibility may benefit from a selection of proper service executables, which should be able to interpret the service metadata found in the data file 716. An interpretation of service metadata in this sense may include support information for supporting the corresponding data types, and may include different opportunities of data presentation. For example, a laptop usually has a bigger display size, with a higher resolution, than that of a PDA display. The data transferred from the PDA may be shown by a more sophisticated presentation format, e.g., via a data graph. Additionally, the data storage format and/or technique may be specific to a particular device type, e.g., one device may use a file format/system while another uses a binary format/system.

Thus, in some implementations, service re-mapping is only allowed between devices of the same pre-determined classes or types. In other implementations, a translation service (not shown) may be used that translates the given service metadata into an appropriate data format which is supported by the selected device 108. For example, such a translation service may use the service metadata of the chosen service executable to identify which data transformations are required.

Figure 8:
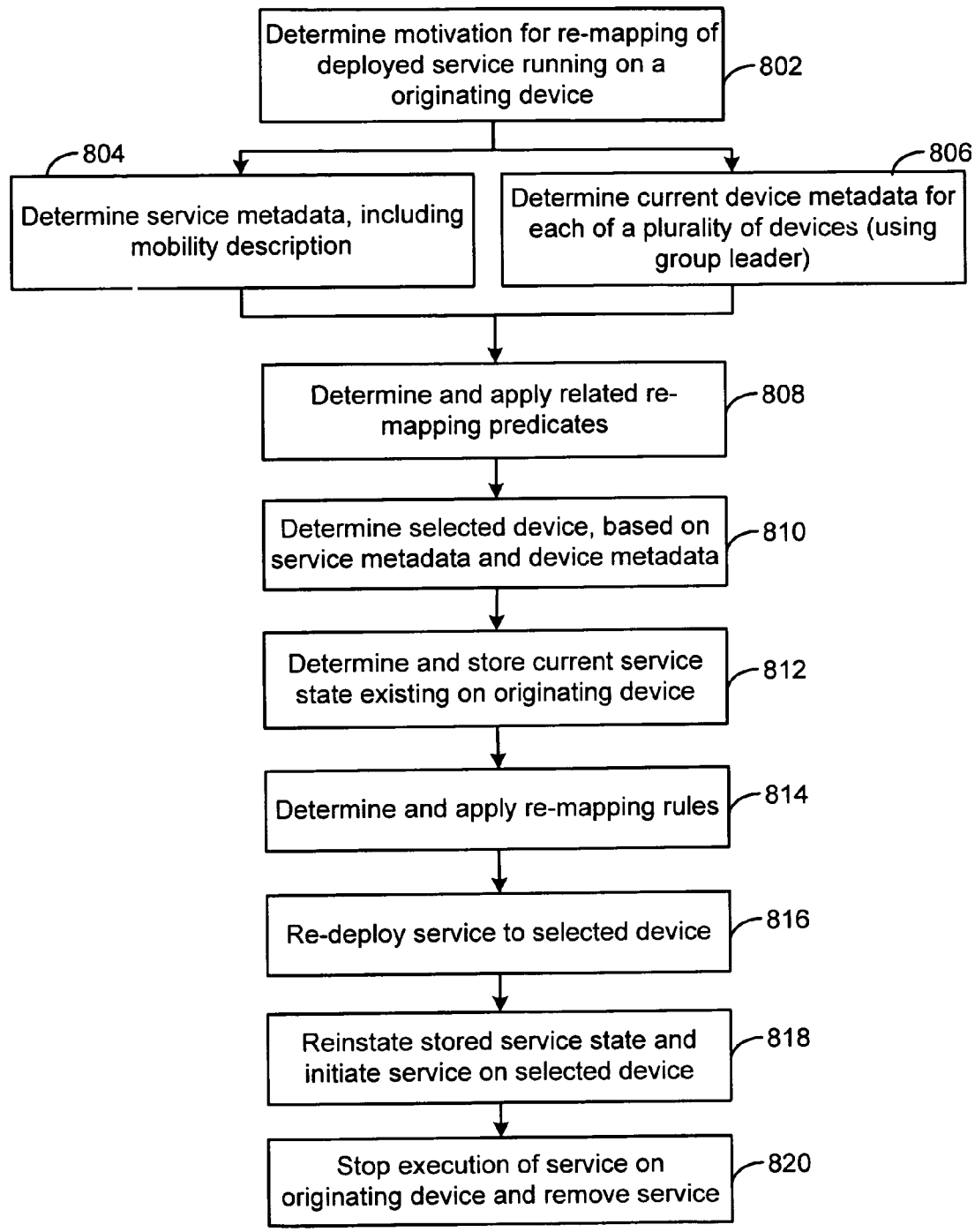
FIG. 8 is a flowchart illustrating a re-mapping operation according to FIG. 2B.

FIG. 8 is a flowchart 800 illustrating a re-mapping operation according to FIG 2B. In FIG. 8, a motivation is determined for re-mapping of a deployed service running on an originating device (802). For example, as already referenced above, it may be the case that a device is on the verge of running out (or moving below a minimum-required level) of some resource, such as memory or power. In some implementations, and with reference to FIG. 7, determining a motivation may include detecting the motivation (e.g., low levels of memory or power) at the monitor component 132b running on the originating device 110, which may then send an alert or notification to the service mapper 120 if device resources run short.

Or, a new or changed device landscape may enable or force such a re-mapping, in order to provide better resource utilization for the network as a whole. A new device landscape may include one or more new powerful devices which lend themselves as new service providers. Services running on relatively less-powerful devices may then be transferred to these more capable devices, in order to achieve a better load-balancing within the network.

Another example of a motivation for re-mapping includes a directive to conduct re-mapping in specified intervals as part of a global monitoring, which may be initiated, for example, by the GSM component 120a and/or the LSM component 120b. Such a global monitoring may determine the motivation in these cases based on whether other defined system constraints are violated. For instance, it may be preferable that certain device groups obey certain invariants, such as, for example, a battery threshold beneath which the group members should not fall, and these invariants may be used as a system constraint. For example, there may exist some groups within the local network 102 that represent more crucial functionality (i.e., more important services) than other groups, so that, in order to ensure a stable environment for such groups, a possible invariant for such crucial groups may be defined, such as the battery threshold just mentioned.

Further, different quality of service (QoS) attributes may be defined for one or more groups, and these QoS attributes may be observed in regular intervals. In these implementations, violation of certain QoS attributes may serve as a motivation for re-mapping. In the context of mobile wireless networks, QoS may refer either to service-level attributes or resource-level attributes. At the service level, reliability and performance may be mentioned, whereas at the resource level, factors such as CPU load, memory, bandwidth, and battery levels represent typical attributes. Generally, then, reliability or performance of a running service may be strongly dependent on current resource capabilities. For example, a lower battery status may increase a probability of device failure in the near future, and may therefore correspond with a reduction in an expected reliability of an associated service.

Once proper motivation has been determined, service metadata associated with the service to be re-mapped is determined (804), and a determination of current device metadata also may be made for each of a plurality of devices (806). For example, the service metadata 126 may be determined from the service repository 124, while the device metadata 130 may be determined using the various device discovery, group leader formation, and/or profile-querying and/or forwarding techniques described above in the context of the various service-to-device mapping examples provided above.

Of course, such techniques may be modified as needed. For example, in a case where the service 706 is only allowed to be re-mapped within the local network 102, there may be no need to perform an inspection of other local networks (e.g., using the GSM metadata table 136). In another example, it may be the case that the motivation for re-mapping includes the entry of a new device to the local network 102, in which case device metadata need only be collected for the new device. Thus, for example, the LSM component 120b may receive aggregated device profile(s) of one or more devices, from a group leader of the associated local network.

Further, re-mapping predicates, if any, may be applied (808). Re-mapping predicates refer generally to technical requirements of a service that are required to be fulfilled before re-mapping may occur. Such re-mapping predicates may include, for example, requirements of an initial mapping of the service to the originating device, group invariants such as those mentioned above, or location constraints. For example, if the initial mapping did not require the selection of the best devices according to a performance metric, then the re-mapping process of FIG. 8 may attempt to apply such a performance metric. As another example, location constraints may be used when failure to re-map the service within an initial group results in the service being moved to a device of a closest neighbor group.

Then, the selected device may be determined, based on the service metadata and the device metadata (810). For example, a matching operation may be performed between similarly-tagged items within XML files of the service metadata and the device metadata. Also, a performance metric may be applied after the matching operation concludes, in order to select a device from the matching devices that is best-suited for implementing the service, according to the performance metric.

As already described, it should be understood that in some cases an identity of the selected device may ostensibly already be known, e.g., based on the determination of the motivation for re-mapping in the first place, such as when a new powerful device enters the local network and triggers re-mapping. In such cases, determination of the selected device may still be considered to refer to application of a matching operation and/or performance metric to the device metadata of the newly-available device, since the determination of the motivation for a possible re-mapping may not be sufficient to ensure an actual viability or desirability of the re-mapping. For example, a device may enter the network with large available reserves of memory and/or power, but may have some other incompatibility (e.g., only operates on a particular development platform) that may prevent re-mapping.

A current service state existing on the originating device may be determined and stored (812). For example, in FIG. 7, the current service state of the service 706 may be stored in the data file 716. The service state may include, for example, most-recently collected data, or most-recently calculated data analysis, or a recently-updated service history.

Then, any re-mapping rules may be determined and applied (814). In this context, re-mapping rules refer generally to rules that prevent otherwise allowed re-mappings, in order to maintain system stability, performance, and/or reliability. For example, one such rule may limit a number or frequency of re-mappings that may be performed with respect to a particular device or pair of devices. For instance, in a case where the device 108 provides sufficient memory space for re-mapping of the service 706, it may occur that the following re-mapping process will free up sufficient memory on the device 110 to trigger a determination of motivation to re-map the service 706 back to the device 110. In other words, the very act of re-mapping may trigger a subsequent re-mapping, which may thus lead to a loop of alternating re-mappings.

Therefore, a first example of a re-mapping rule may be based on an ordering of device metadata (e.g., device profiles). For example, a weighted metric similar to Eq. (2) may be used to assign a numeric value to each device profile, i.e., based on weighted resource attributes. Then, to solve the problem of a frequent alternating re-mapping process, a re-mapping rule may be created in which re-mapping is realized if and only if a difference between calculated values of an originating and a selected device is larger than some defined threshold. Thus, depending on a value of this threshold, remapping will only be undertaken in cases where one or more devices with significantly superior resource abilities than the originating device are available.

In a second example of a re-mapping rule, a frequency of involvement of each device in re-mapping process(es) may be determined. Then, to avoid alternating re-mappings, an originating device may only become a target or selected device again if a certain defined time has elapsed. Thus, every device may possess a local timer that indicates the last time when the device was involved in a re-mapping process. In other implementations, one or more global timers may be implemented by the LSM component 120b that applies to one or more devices of one or more groups of the local network. Such a timer may typically be reset after each re-mapping.

Of course, other re-mapping rules may be defined and implemented. Additionally, various combinations of these re-mapping rules may be used, including a combination of the two examples rules just described.

If the re-mapping rules are satisfied, then the service may be re-deployed to the selected device (816). For example, the LSM component 120b may transfer the service executable from the service repository 124 to the selected device, e.g., using an appropriate service injector, as already described.

The LSM component 120b also may initiate the transfer of the service state, e.g., using the data file 716, and initiate the service on the selected device, e.g., again, using the appropriate service injector (818). Finally in FIG. 8, the LSM component 120b may send a stop command for the service on the originating device (820). In some implementations, the actual stopping of the service on the source device may be accomplished after the transfer is finished. For example, as referenced above, services that are employed to detect or to avoid dangerous situations may be required to be continued until the re-mapped and re-deployed service is ready to take over control from its new position on the selected device.

Figure 9:
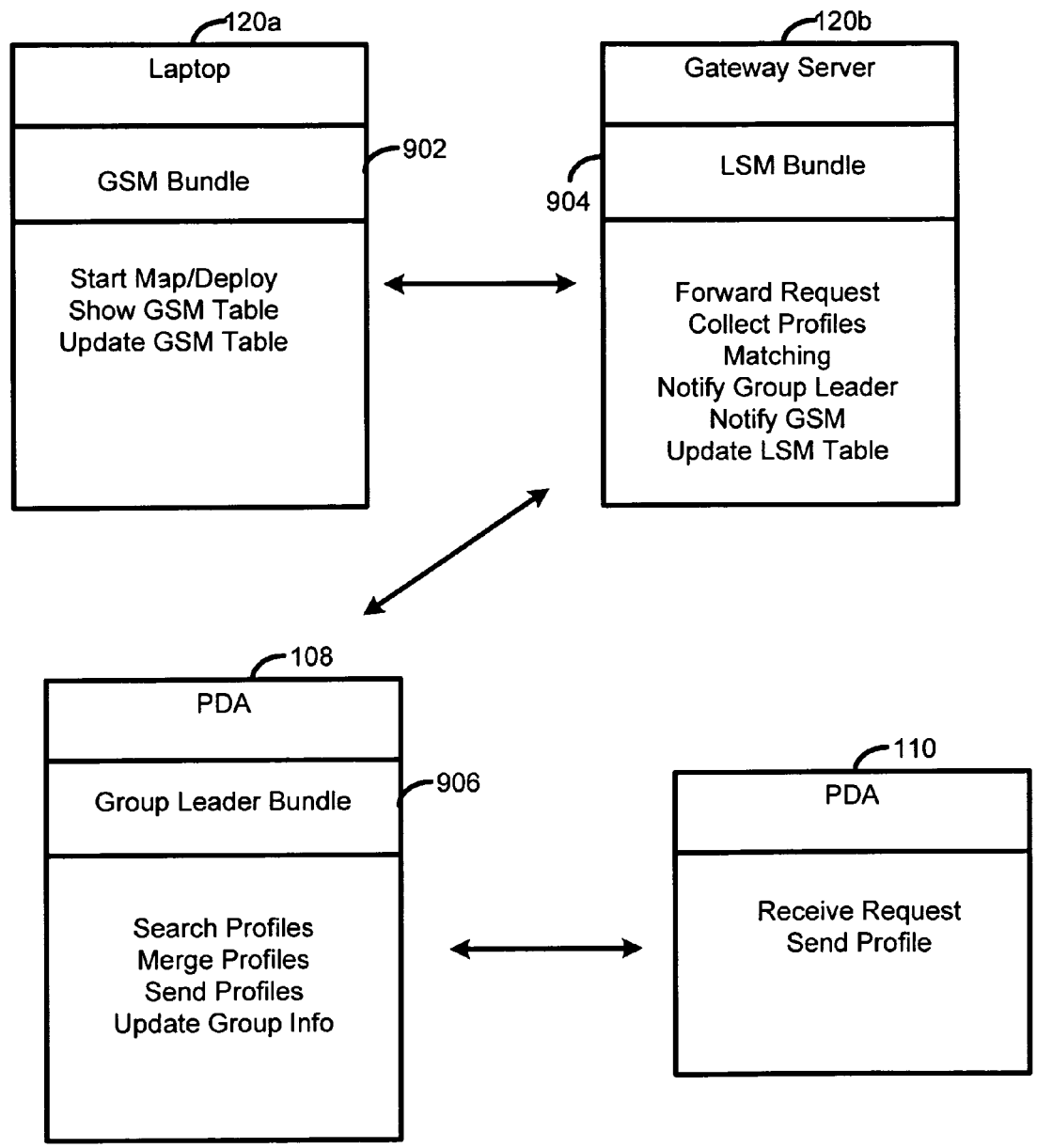
FIG. 9 is a block diagram of an example implementation of the system(s) of FIGS. 1 and/or 7.

FIGS. 9-19 provide various examples of the service-to-device mapping and/or re-mapping techniques described above. FIG. 9 is a block diagram of a class diagram of an OSGi implementation of the three-tier service mapper 120, including the GSM component 120a, the LSM component 120b, and the device 108 (running the GLSM component 120c of FIG. 1).

In the example of FIG. 9, examples of appropriate devices for each of the illustrated components are discussed in more detail below, and OSGi bundles are installed on each of the devices and managed by the OSGi environment. The bundles may thus communicate with one another to implement the service-to-device mapping (and/or re-mapping) described herein.

More specifically, the GSM component 120a may be implemented in the example of FIG. 9 by a laptop computer running an installed GSM bundle 902. The GSM bundle 902 is in charge of starting the service mapping and deployment by calling a Java Server Page (JSP), which is an example of a known technique for generating dynamic web pages on a web server, that displays the GSM metadata table 136 (as described in more detail below, with respect to FIGS. 10 and 17). Of course, as referenced above, this implementation is merely an example, and, in other implementations, the service mapping may be initiated by a call from another system component, e.g., using an application program interface (API) associated with the GSM component 120a. The GSM bundle 902 also may be used to update the GSM metadata table 136 based on results of the service-to-device mapping.

The LSM component 120b in FIG. 9 may be a gateway server that may have lesser computational resources than the GSM component 120a. The LSM component serves as a gateway having an installed LSM bundle 904 that receives a service mapping request from the GSM component 120a and then conducts the service-to-device mapping. Specifically, the LSM bundle may forward the service-to-device mapping request, collect device profiles of devices within (groups of) the local network, and match the device profiles or other device metadata against service metadata (e.g., requirements). The LSM bundle 904 thus also may notify the group leader(s) of group(s) of the devices that profiles are needed, notify the GSM component 120a of results of the matching operations, and update the LSM metadata table 138.

The device 108 in FIG. 9 includes a PDA running an installed group leader bundle 906. The group leader bundle 906 is operable to query/search profiles or other device metadata of group devices, merge the profiles into a single message, and send the message with the profiles to the LSM component 120b. The group leader bundle 906 also may update group information, e.g., for inclusion in the LSM metadata table 138.

Finally in FIG. 9, the device 110 is illustrated as a group member that receives a request for its profile from the group leader 108, and responds to that request with the appropriate profile. Of course, the device 110 also may ultimately receive the service being mapped or re-mapped, and results of such mapping or re-mapping may be reported to the group leader device 108, as well.

Figure 10:
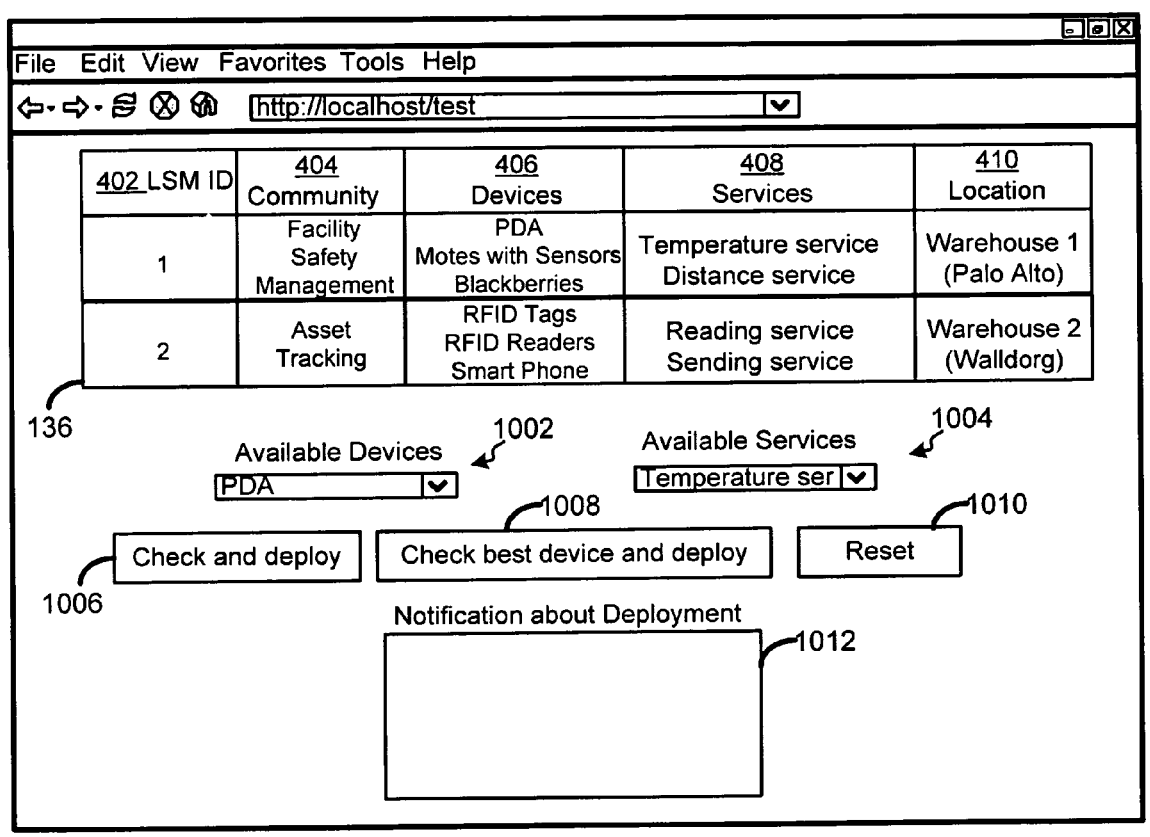
FIG. 10 is a screenshot of a server page for interactively specifying a service-to-device mapping request by a human user.

FIG. 10 is a screenshot 1000 illustrating an example of the GSM table prior to a beginning of a service-to-device mapping. In the example of FIG. 10, and as mentioned above, the screenshot 1000 may represent a JSP page, on which an administrator or other user may first explore the types of devices and already-installed services may exist in the identified local networks. For example, the GSM metadata table 136 is illustrated as containing information about both the facility safety management community 302 of FIG. 3, as well as the asset tracking community 304.

Thus, for example, the administrator may select services and/or devices of the GSM metadata table 136, e.g., using a drop-down list 1002 for selecting available devices, and/or a drop-down list 1004 for selecting available services. Such selective lists may show all available devices that exist in an enterprise (within the different local networks), as well as all services inserted in the service repository 124. The administrator may thus select various types of service-to-device mapping. For example, the administrator may start the service mapping/deployment on all devices of a device type (e.g., PDA) chosen by way of the list 1002, or may deploy a chosen service on the best-available device of a specific device type.

Figure 16:
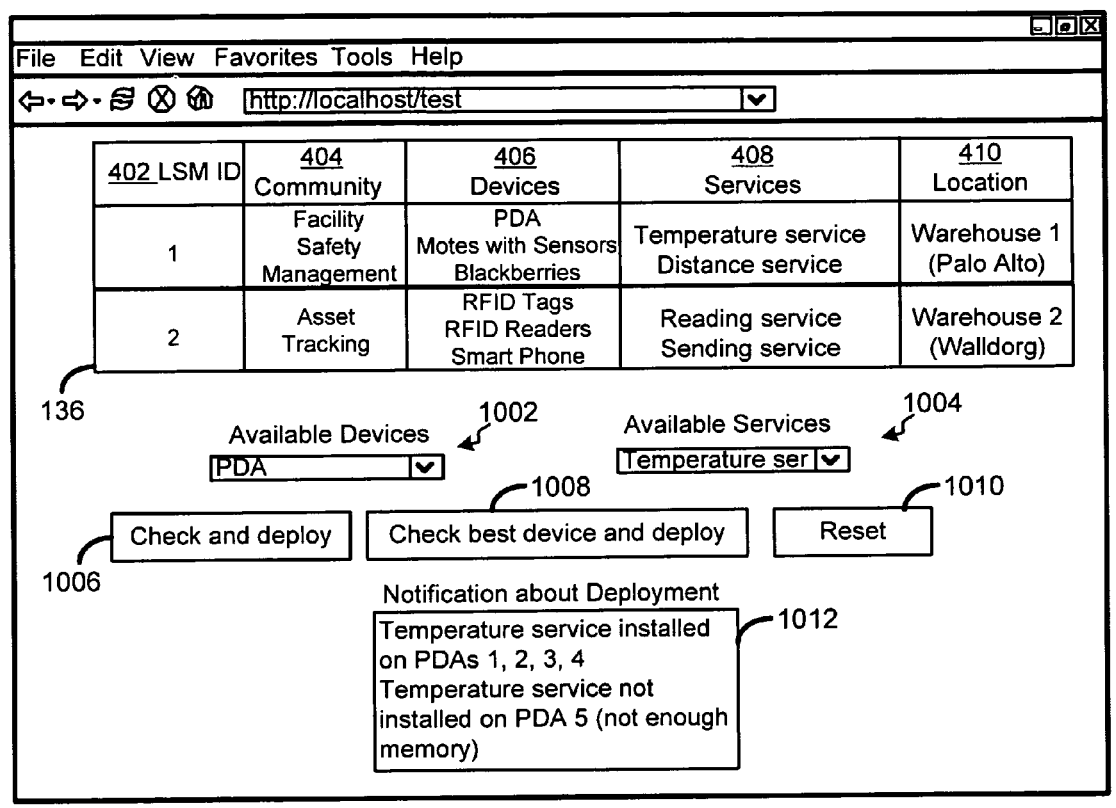
FIG. 16 is a screenshot of a server page showing results of a service-to-device mapping request.

In the first example, the service mapper 120 may, in response to a selection of a "check and deploy" button 1006, investigate whether the technical requirements of a selected service may be fulfilled by the current device capabilities. In the second example, the service mapper may detect the most powerful device with respect to available resources, based on a selection of a "check best device and deploy" button 1008 by the administrator. Finally in FIG. 10, a reset button 1010 allows the administrator to reset the fields of the JSP of the screenshot 1000, while a "notification about deployment" field 1012 provides post-deployment (and/or attempted deployment) information to the administrator (an example of which is shown in FIG. 16). As should be apparent, the described identification of local networks, devices, and/or services may either be performed manually by an administrator, or as part of an automatic process.

Once the administrator has started the service-to-device mapping by selecting the button 1006 or 1008, input parameters such as service name, device type, and deployment mode (e.g., some, all, or best device(s)) are transferred to the LSM component 120b. Then, the LSM bundle 904 receives these input parameters, and opens a connection to the service repository 124 to retrieve the corresponding service metadata (e.g., a service description file) that may contain information regarding technical requirements of that service.

FIG. 11 is an example of such a service metadata file 1100. Specifically, FIG. 11 illustrates an XML file ("service.xml") in which a section 1102 identifies the nature of the file as a service metadata (e.g., service requirements) description file, while a section 1104 in the remainder of the file includes various requirements for service parameters including memory, CPU, battery, platform, and connection characteristics, as shown. FIG. 12 is an example of a specific instance 1200 of the service metadata file of FIG. 11, in which specific parameters are illustrated for the various service requirements. Thus, FIG. 12 may be understood to be a specific example of an instance of the service metadata 126 of FIG. 1. Specifically, for example, section 1402 specifies a memory requirement of 300 MB, a CPU speed of 200 MHz, and corresponding measures for other illustrated parameters related to battery life, platform information, and connection characteristics. Although the illustrated descriptions files are shown as XML files, it should be understood that other file-types and/or representation formats may be used.

After the gateway server/LSM component 120b receives and saves the service description file (e.g., the file illustrated in FIG. 12), the various service-to-device mapping operations described above (e.g., FIG. 2A and FIG. 6) may be implemented. For example, a message may be sent to the group leader device 108, which may collect all device metadata (e.g., device profiles) of its group member devices, and merge the profiles into a single XML-file (profiles.xml). This XML-file will be send back to the gateway server/LSM component 120b. FIG. 13 is a partial example of such an XML-file 1300, in which a first section 1302 identifies the nature of the file as a device metadata (e.g., device profile) description file, while a section 1204 in the remainder of the file includes various requirements for service parameters including a device description (e.g., name, type, or vendor) and a hardware description (e.g., CPU description, connection characteristics, and memory description). As just mentioned, FIG. 13 is a partial example, and it should be understood from the discussion above that various other device characteristics may be included in the device profile. For example, FIG. 14 illustrates a specific instance 1400 of a full example of the device profile of FIG. 13, and includes a description portion 1402, a hardware description portion 1404, a software description portion 1406, and a device status portion 1408. As illustrated, each of these portions 1402-1408 may include various device parameters that correspond to the examples provided above with respect to FIG. 1, or may include other device parameters. Thus, FIG. 14 may be understood to be a specific example of an instance of the device metadata 130 of FIG 1.

The gateway server/LSM component 120b, after receiving the device metadata XML-file with all current device capabilities, may perform matching of the device metadata file with the service metadata file. For example, the gateway server/LSM component 120b may parse both XML-files, i.e., the service.xml file of FIG. 13 and the profiles.xml file of FIG. 15. Then, gateway server/LSM component 120b may compare the technical requirements of the service with the current device resources. For example, the value of the tag <memory>, contained in service.xml will be compared with the corresponding tag <memory>, contained in profiles.xml-file.

Finally, the gateway server/LSM component 120b informs the laptop/GSM component 120a about the devices on which the requested service may be deployed. If no such device is available, the gateway server/LSM component 120b may inform the laptop/GSM component 120a that no available device fulfills the technical requirements of the service, and may provide a specific reason as to why the service could not be deployed on that specific device, e.g. not enough available memory.

For example, with regard to FIG. 10, it may be the case that the administrator wishes to deploy the temperature service showing a current temperature of goods in a warehouse on a PDA. In this example, there may be five PDAs within the warehouse. The administrator may access the JSP of the screenshot 1000 of FIG. 10, and select the device(s) and service using the lists 1002 and 1004, respectively. Then, the administrator may select the "check and deploy" button 1006.

Figure 15:
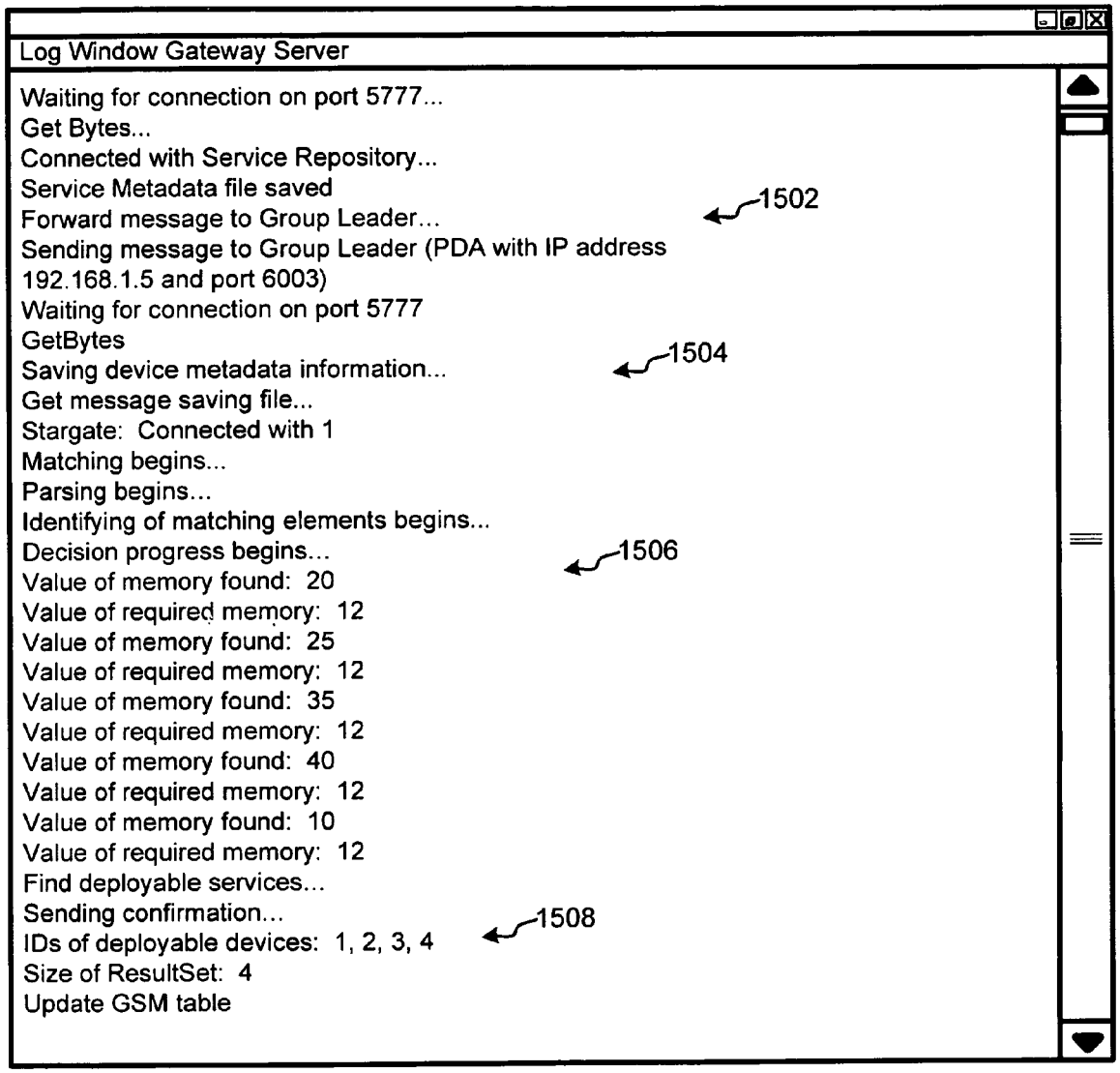
FIG. 15 is a screenshot illustrating results of a service-to-device mapping request.

As a result, the gateway server/LSM component 120b may perform as already described, with results of such performance being provided in a log window 1500 of FIG. 15. Specifically, a section 1502 illustrates that the the gateway server/LSM component 120b accesses the service repository 124 to obtain the service metadata (e.g., requirements) file, such as is illustrated in FIG. 12. In a section 1504, the gateway server/LSM component 120b sends a message to the group leader device 108 with instructions to obtain device metadata (e.g., device profiles) for each device within the group, such as is illustrated in FIG. 14, which is then saved.

Then, in a section 1506, a matching operation is performed, in which, in this example, memory requirements of the service are matched against device characteristics. As shown, four of the five checked device profiles have sufficient memory, while a fifth device (PDA) does not. Therefore, in FIG. 16, a screenshot 1600 of an updated version of the JSP of the screenshot 1000 is illustrated in which the "notification about deployment" field 1012 informs the administrator of the fact that the service was installed on four of the five devices, but that the fifth device did not have sufficient memory.

Of course, the above provides just one example, and many other examples are possible. For instance, the administrator may prefer to deploy the service only on the best PDA of the five PDAs available. In this case, the administrator may simply select the "check best device and deploy" button 1008, and, in the present example, the service mapper 120 will identify and deploy the service to the PDA having the most memory capacity.

Figure 17:
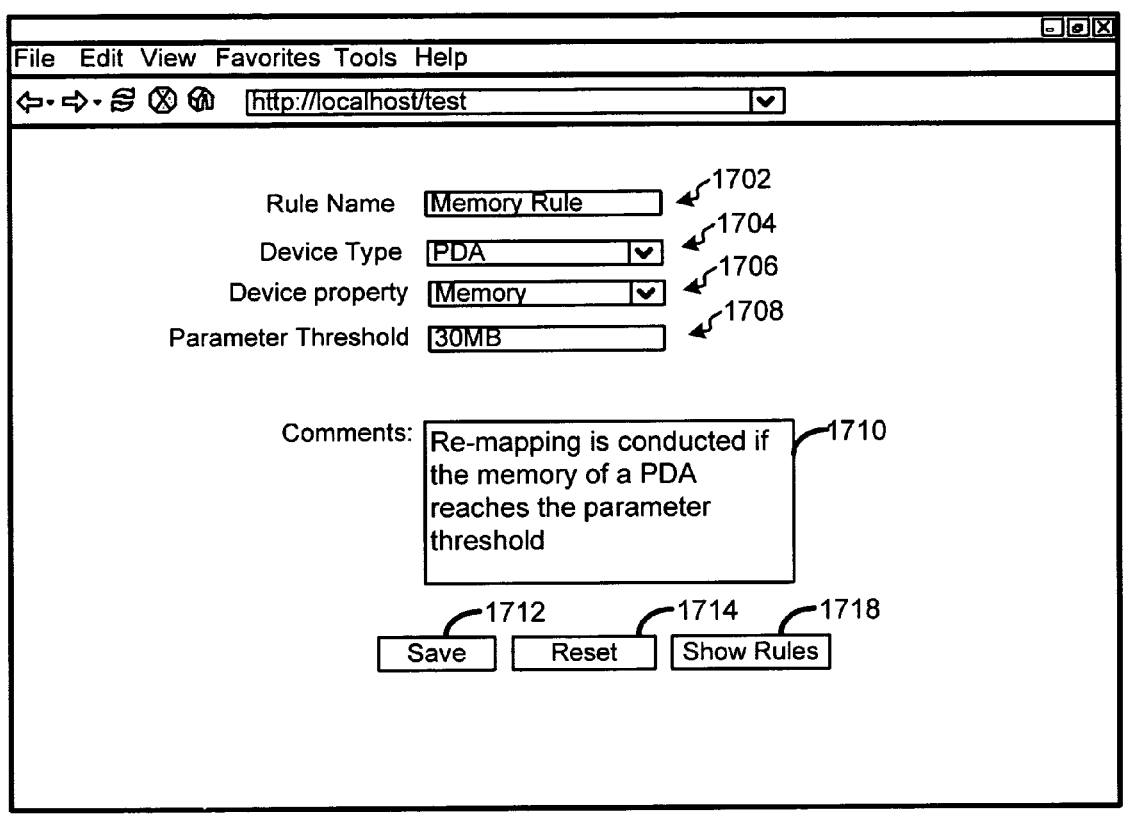
FIG. 17 is a screenshot illustrating a portion of a re-mapping procedure.

FIG. 17 is a screenshot 1700 for performing a re-mapping operation. Specifically, FIG. 17 illustrates an example in which a JSP is used that includes a field 1702 for identifying a re-mapping rule that governs the re-mapping process. Further, a field 1704 is used to identify a device type, while a field 1706 is used to identify a device property, and a field 1708 is used to identify a threshold for the parameter(s) of the rule. A field 1710 provides space for comments explaining an implementation of the rule. In this case, the rule specifies that re-mapping is to be conducted if the memory of a PDA in the network/group reaches the specified parameter threshold of 30 MB. In other words, for example, the rule specifies that a system monitor component may determine whether and when one or more PDAs of the five available PDAs are capable of providing at least 30 MB of memory for (re-)deployment thereon of a designated service. In the screenshot 1700, a save button 1712 allows the administrator to save the displayed rule, while a reset button 1714 allows the administrator to reset the contents of the fields 1702-1710 of the screenshot 1700. Finally, a "show rules" button 1706 allows the administrator to view one or more of any rules that have previously been created. Also, as already mentioned, one or more of the various functions described above with respect to FIG. 17 may be performed by a system component, using an API of the GSM component 120a, rather than by a human user.

During re-mapping, and as already described with respect to FIGS. 2B and 8, the re-mapping process may be supported by the gateway server/LSM component 120b. For example, to enable remapping, the LSM bundle 904 may start a control thread designed to observe whether the administrator has defined any re-mapping rules. If a new rule is set by the administrator, the thread will receive and save it. If a service re-mapping needs to be performed, the gateway server/LSM component 120b may relocate the service from a relatively resource-poor device to a relatively resource-rich device (e.g., the most resource-rich device presently available).

When the group leader device 108 receives the request from the gateway server/LSM component 120b, the group leader device 108 begins collecting all device profiles of its associated group. Since, in this example, the group contains four other group members, the group leader device 108 may send a message to the group members, whereupon each one of the group members may respond with its corresponding device metadata (e.g., its device profile).

As already described, the group leader device 108 may then receive the incoming device profiles and merge them into a single xml-file (e.g., according to the profiles.xml message format of FIG. 13). Once all profiles are received and merged, the group leader device 108 may send the collected device profiles to the gateway server/LSM component 120b.

Additionally, or alternatively, the PDA bundle 906 may start a control thread which observes the device landscape. Accordingly, if a new device joins the network, the group leader device 108 may be informed by this thread. For example, such a new device may be required to send a "hello-message" to the device landscape thread. If the group leader device 108 recognizes such a new group member, then a collection process for collecting the device profiles (inclusive of the new profile) may start. The group leader device 108 may then send the merged profiles to the gateway server/LSM component 120b (as described above), so that the gateway server/LSM component 120b may then determine whether and how re-mapping should be conducted.

Upon receiving the merged device profiles, the gateway server/LSM component 120b may perform the matching operations described herein, and possibly implement an appropriate performance metric. Then, and assuming that at least one of the devices matches the parameter threshold(s) and therefore satisfied the re-mapping rule(s), then the pertinent service may be re-mapped and redeployed as described herein.

As described herein, an architectural framework and a service-to-device mapping algorithm enable the automatic intelligent mapping of services to appropriate smart item devices. The mapping mechanism is based on a sophisticated description of the semantics of services (e.g., technical requirements like memory or CPU power, expected input/output, behavior and possibly other properties) and available devices (e.g., technical capabilities in terms of memory, CPU and battery life, as well as reliability). Based on this knowledge, and for a given service to be deployed, the service mapper identifies possible candidate devices that could host the service. Then, based on the technical requirements and properties of the service and the devices, respectively, the most cost-effective device (for example, in terms of processing and memory capabilities) is selected for automatic deployment.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A hierarchical, multi-tiered mapping and monitoring system for use with a plurality of device networks, the system comprising a plurality of computing devices having respective processors and memories, the memories containing instructions that when loaded onto the processors cause the processors to implement:
    a global service that is configured to track global device metadata associated with the plurality of device networks, wherein each device network includes devices and associated sensors, and wherein each of the devices is configured to execute at least one sensor service to control an operation of a corresponding sensor;
    a local service that is configured to track local device metadata associated with at least one device network of the plurality of device networks, and to update the global device metadata based thereon; and
    a group leader service that is configured to query a group of devices of the at least one device network and aggregate group-level device metadata for transmission to the local service and updating of the local device metadata,
    wherein at least one of the global service, the local service, and the group leader service are configured to determine a cause for re-deployment of an executing sensor service that controls operation of a first sensor of an originating device having a sensor type, map the executing sensor service to a selected device from among a plurality of devices that includes the originating device and the selected device, and re-deploy the executing sensor service on the selected device, wherein the selected device is associated with a second sensor of the sensor type and the executing sensor service thereafter controls operation of the second sensor.

2. The system of claim 1 wherein the at least one of the global service, the local service, and the group leader service are configured to determine the cause for re-deployment of the executing sensor service based on device-level device metadata associated with the originating device and indicating that the originating device currently has insufficient device characteristics to continue adequately implementing the executing sensor service, relative to service metadata associated with the executing sensor service.

3. The system of claim 1 wherein the at least one of the global service, the local service, and the group leader service are configured to determine the cause for re-deployment of the executing sensor service including:
    determining that the selected device is available for re-deployment of the executing sensor service; and
    determining device-level device metadata associated with the originating device and the selected device that indicates that the selected device is better able to implement the executing sensor service, including
        determining the device metadata by representing device characteristics of the originating device and the selected device in a common format;
        value-matching the device characteristics of each of the originating device and the selected device to service characteristics of the executing sensor service as represented in associated service metadata, and
        selecting the selected device as having a closer value-match of device characteristics to the service characteristics than the originating device.

4. The system of claim 1 wherein the at least one of the global service, the local service, and the group leader service are configured to map the executing sensor service to the selected device based on at least one of the group-level device metadata, the local device metadata, or the global device metadata.

5. The system of claim 1 wherein the at least one of the global service, the local service, and the group leader service are configured to map the executing sensor service to the selected device based on device-level device metadata associated with the originating device and/or the selected device, relative to service metadata associated with the executing sensor service.

6. The system of claim 1 wherein the at least one of the global service, the local service, and the group leader service are configured to map the executing sensor service to the selected device based on service metadata associated with the executing sensor service, the service metadata including a mobility description associated with the executing sensor service and describing a nature and/or extent of allowed re-deployment of the executing sensor service.

7. The system of claim 1 wherein the at least one of the global service, the local service, and the group leader service are configured to map the executing sensor service to the selected device including imposing a time limit to be met before the executing sensor service may be re-deployed from the selected device back to the originating device, or to another device.

8. The system of claim 1 wherein the at least one of the global service, the local service, and the group leader service are configured to re-deploy the executing sensor service on the selected device by re-instating, on the selected device, a state of the executing sensor service on the originating device prior to the re-deploying.

9. The system of claim 1 wherein the at least one of the global service, the local service, and the group leader service are configured to re-deploy the executing sensor service on the selected device by obtaining a service executable of the executing sensor service from a service repository for deploying on the selected device.

10. The system of claim 1 wherein the executing sensor service includes at least one of the global service, the local service, or the group leader service.

11. The system of claim 1 wherein the global service, the local service, and the group leader service are associated, respectively, with a global service monitor component, a local service monitor component, and a group leader service monitor component, and wherein the originating device and/or the selected device is configured to implement a device-level monitor component.

12. The system of claim 1 wherein the sensor of the originating device and/or the selected device is configured to detect an environmental event or condition for reporting thereof to the group leader service.

13. The system of claim 1 wherein the global service and the global device metadata are associated with a plurality of local device networks, each of the local device networks associated with a semantic or functional description that is stored in the global device metadata and that is independent of a current physical location of the local device networks.

14. The system of claim 1 wherein the local service and the local device metadata are associated with a plurality of groups of networked devices, each of the groups of networked devices associated with a semantic or functional description that is stored in the local device metadata and that is independent of a current physical location of the groups of networked devices.

15. A method comprising:
    determining a cause for re-deployment of an executing sensor service that controls operation of a first sensor, of a first sensor type, of an originating device within at least one network of devices, at one or more of a global service, a local service, or a group leader service that are executing on a plurality of the devices, wherein each device network includes devices and associated sensors, including the first sensor, and wherein each of the devices is configured to execute at least one sensor service to control an operation of a corresponding sensor;

mapping the executing sensor service to a selected device from among the at least one network of devices; and re-deploying the executing service on the selected device, wherein the selected device is associated with a second sensor of the sensor type and the executing sensor service controls operation of the second sensor after the re-deploying, and wherein the global service is configured to track global device metadata associated with the plurality of device networks, the local service is configured to track local device metadata associated with at least one device network of the plurality of device networks, and to update the global device metadata based thereon, and the group leader service is configured to query a group of devices of the at least one device network and aggregate group-level device metadata for transmission to the local service and updating of the local device metadata.

16. The method of claim 15 wherein determining the cause comprises:

determining the cause based on device-level device metadata associated with the originating device and indicating that the originating device currently has insufficient device characteristics to continue adequately implementing the executing sensor service, relative to service metadata associated with the executing sensor service.

17. The method of claim 15 wherein determining the cause comprises:

determining that the selected device is available for re-deployment of the executing sensor service; and determining device-level device metadata associated with the originating device and the selected device that indicates that the selected device is better able to implement the executing sensor service, including determining device characteristics of the originating device and at least the selected device in a common format;

value-matching the device characteristics of each of the originating device and at least the selected device to service characteristics of the executing sensor service, and determining that at least the selected device has a closer value-match of device characteristics to the service characteristics than the originating device.

18. The method of claim 15 wherein determining the cause comprises:

collecting device-level device metadata associated with the originating device and/or the selected device using at least one device-level monitor component stored thereon;

receiving the device-level metadata at the group leader service;

aggregating the device-level metadata at the group leader service for forwarding to the local service for updating of local device metadata; and updating global device metadata associated with the global service, based on the updating of the local device metadata.

19. The method of claim 15 wherein mapping the executing sensor service to the selected device comprises:

matching service metadata associated with the executing sensor service with one or more of global device metadata associated with the global service, local device metadata associated with the local service, or group level device metadata associated with the group leader service.

20. The method of claim 15 wherein re-deploying the executing sensor service on the selected device comprises re-instating, on the selected device, a state of the executing sensor service on the originating device prior to the re-deploying.

* * * * *